US011861910B2

(12) United States Patent
Ma et al.

(10) Patent No.: US 11,861,910 B2
(45) Date of Patent: Jan. 2, 2024

(54) METHOD AND SYSTEM FOR ACQUIRING ITEM PLACING STATE

(71) Applicants: Beijing JingDong ShangKe Information Technology Co., Ltd., Beijing (CN); Beijing Jingdong Century Trading Co., Ltd., Beijing (CN)

(72) Inventors: Bin Ma, Beijing (CN); Xinwei Fan, Beijing (CN); Yinhua Zhou, Beijing (CN); Xingyi Li, Beijing (CN); Biao Wang, Beijing (CN)

(73) Assignees: Beijing JingDong ShangKe Information Technology Co., Ltd., Beijing (CN); Beijing Jingdong Century Trading Co., Ltd., Beijing (CN)

( * ) Notice: Subject to any disclaimer, the term of this patent is extended or adjusted under 35 U.S.C. 154(b) by 313 days.

(21) Appl. No.: 17/263,847

(22) PCT Filed: Jul. 26, 2019

(86) PCT No.: PCT/CN2019/097936
§ 371 (c)(1),
(2) Date: Jan. 27, 2021

(87) PCT Pub. No.: WO2020/020355
PCT Pub. Date: Jan. 30, 2020

(65) Prior Publication Data
US 2021/0319684 A1    Oct. 14, 2021

(30) Foreign Application Priority Data
Jul. 27, 2018 (CN) .......................... 201810851381.2

(51) Int. Cl.
*G06V 20/52*   (2022.01)
*G06T 7/70*    (2017.01)
(Continued)

(52) U.S. Cl.
CPC ................ *G06V 20/52* (2022.01); *G06T 7/70* (2017.01); *G06V 10/25* (2022.01); *G06V 20/36* (2022.01);
(Continued)

(58) Field of Classification Search
CPC ........ G06V 20/52; G06V 10/25; G06V 20/46; G06V 20/36; G06T 7/70; G08B 21/18
(Continued)

(56) References Cited

U.S. PATENT DOCUMENTS 6,307,963 B1   10/2001  Nishida et al.
10,706,314 B2   7/2020  Zhao et al.
(Continued)

FOREIGN PATENT DOCUMENTS

CN    102830958    12/2012
CN    103150631     6/2013
(Continued)

OTHER PUBLICATIONS

International Search Report and Written Opinion, issued in the corresponding PCT application No. PCT/CN2019/097936, dated Oct. 31, 2019, 11 pages.
(Continued)

*Primary Examiner* — Kerri L McNally
(74) *Attorney, Agent, or Firm* — Hamre, Schumann, Mueller & Larson, P.C.

(57) ABSTRACT

The present disclosure provides a method for acquiring an item placing state, including: sending an acquisition request, wherein the acquisition request includes one or more association relationships, each of the association relationships
(Continued)

includes an association relationship between a hot zone and a camera equipment, and one hot zone corresponds to one kind of item; and receiving a placing state of an item corresponding to at least one hot zone, wherein the placing state of the item corresponding to the at least one hot zone is determined according to a current image and a standard image of the at least one hot zone in response to the acquisition request. The present disclosure further provides a processing method, a system for acquiring an item placing state and a processing system.

14 Claims, 12 Drawing Sheets

(51) Int. Cl.
  *G06V 10/25* (2022.01)
  *G06V 20/00* (2022.01)
  *G06V 20/40* (2022.01)
  *G08B 21/18* (2006.01)
(52) U.S. Cl.
  CPC ............. *G06V 20/46* (2022.01); *G08B 21/18* (2013.01); *G06T 2207/30232* (2013.01); *G06T 2207/30242* (2013.01); *G06V 2201/07* (2022.01)
(58) Field of Classification Search
  USPC ........................................................ 340/540
  See application file for complete search history.

(56) References Cited

U.S. PATENT DOCUMENTS

| 2014/0161305 | A1* | 6/2014 | Lee ...................... H04N 13/261 382/103 |
| 2015/0310601 | A1* | 10/2015 | Rodriguez ........... G06Q 20/208 348/150 |
| 2016/0042375 | A1* | 2/2016 | Naqvi ................ G06Q 30/0631 705/7.34 |
| 2016/0302044 | A1* | 10/2016 | Bottazzi .................. H04W 4/30 |
| 2017/0262783 | A1* | 9/2017 | Franceschini .. G06Q 10/063112 |
| 2019/0019053 | A1 | 1/2019 | Zhao et al. |

FOREIGN PATENT DOCUMENTS

| CN | 105374031 | 3/2016 |
| CN | 105868772 | 8/2016 |
| CN | 105872595 | 8/2016 |
| CN | 107077659 | 8/2017 |
| CN | 107393152 | 11/2017 |
| CN | 107730168 | 2/2018 |
| CN | 107862247 | 3/2018 |

OTHER PUBLICATIONS

Chinese Office Action, issued in corresponding Chinese Application No. 201810851381.2, dated Oct. 27, 2023, 10 pages.

* cited by examiner

| Store name: | select store | Shelf number: | select shelf | Hot zone number: | select hot zone | | In charge: | select person |
|---|---|---|---|---|---|---|---|---|
| Item name: | input item name | Item number: | input item number | Hot zone state: | select state | | Query | Reset |

Hot zone real-time state

| No. | Store name | Shelf number | Hot zone number | Item name | Item number | Standard image | Real-time image | State | In charge |
|---|---|---|---|---|---|---|---|---|---|
| 1 | xxx | xxx | xxx | xxx | xxx | | | Normal | xxx |
| 2 | xxx | xxx | xxx | xxx | xxx | | | Out of stock | xxx |
| 3 | xxx | xxx | xxx | xxx | xxx | | | Irregular | xxx |
| 4 | xxx | xxx | xxx | xxx | xxx | | | Misplaced | xxx |
| 5 | xxx | xxx | xxx | xxx | xxx | | | Normal | xxx |
| 6 | xxx | xxx | xxx | xxx | xxx | | | Out of stock | xxx |
| 7 | xxx | xxx | xxx | xxx | xxx | | | Irregular | xxx |
| 8 | xxx | xxx | xxx | xxx | xxx | | | Misplaced | xxx |
| 9 | xxx | xxx | xxx | xxx | xxx | | | Normal | xxx |
| 10 | xxx | xxx | xxx | xxx | xxx | | | Out of stock | xxx |

1-10/xx pages　　　　　　　　　First page  <U  1  2  3  4  5  D>  Last page

Fig. 4

Standard image       Real-time image

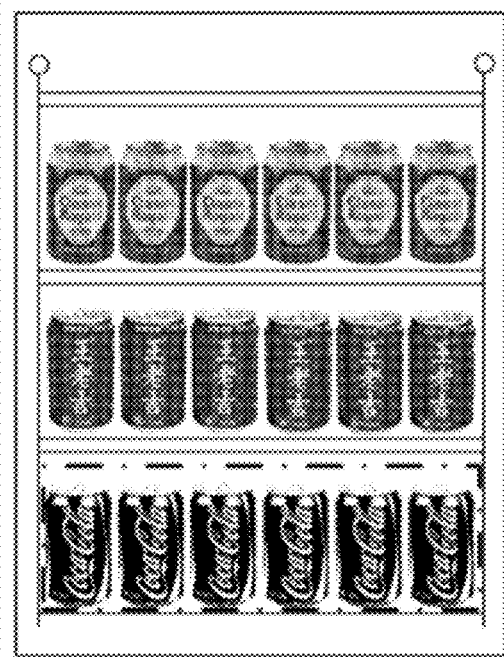
Standard image
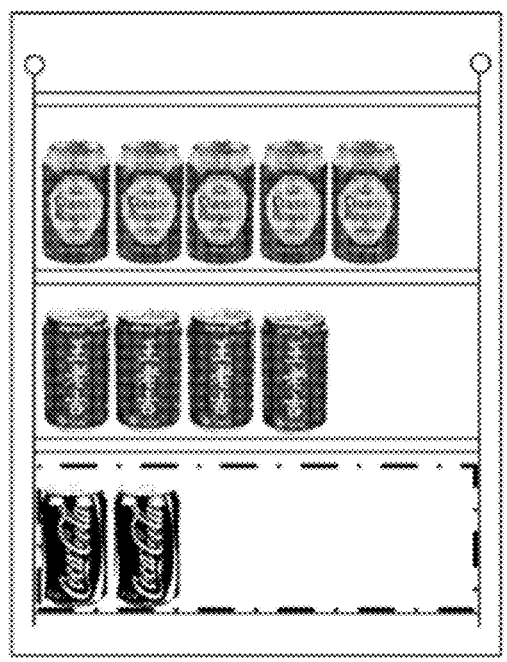
Real-time image
Fig. 8B
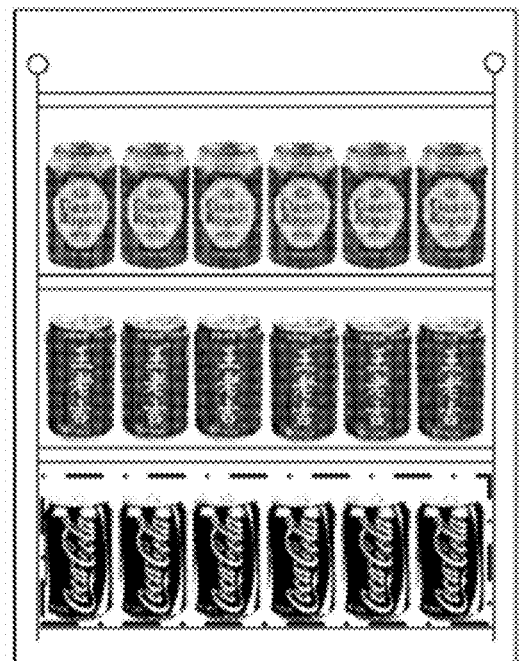
Standard image
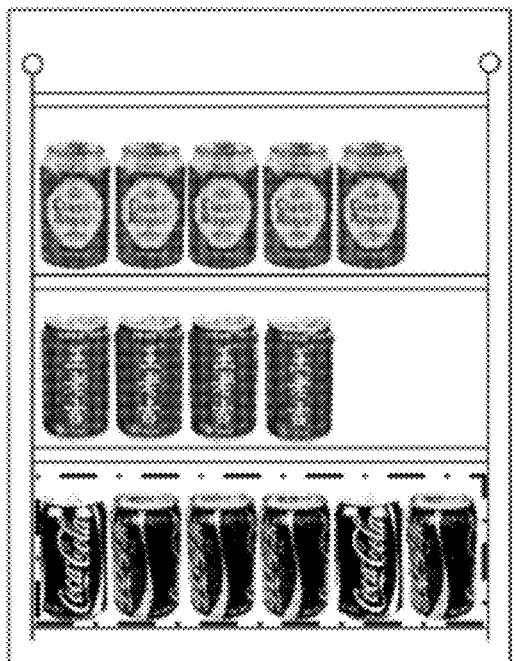
Real-time image
Fig. 8C

METHOD AND SYSTEM FOR ACQUIRING ITEM PLACING STATE

TECHNICAL FIELD

The present disclosure relates to the field of electronic technology, in particular to a method and a system for acquiring an item placing state.

BACKGROUND

With the intertwining forces of consumption and technology, a retail infrastructure has changed, which triggers the fourth retail revolution, and brings people into an era of unbounded retail.

In an era of unbounded retail, one of the most important infrastructures is a shelf, and one of the key links is tally.

In the process of realizing the concept of the present disclosure, the inventor found that in the prior art there at least existed the following problems: in the prior art, a tally work of a retail store does not have mature technology to support, and placing states of items on the shelf is mainly obtained by manual inspection, or obtained depending on tally experience. As a result, the placing states of the items on the shelf cannot be acquired in time, not only the defects of serious tally delay and poor timeliness, but also the defects of poor tally accuracy, low efficiency, and high tally cost are existed.

SUMMARY

In view of this, the present disclosure provides a method and a system for acquiring an item placing state capable of improving a tally efficiency and a processing method and a system.

According to an aspect of the present disclosure, there is provided a method for acquiring an item placing state, including: sending an acquisition request, wherein the acquisition request includes one or more association relationships, each of the association relationships includes an association relationship between a hot zone and a camera equipment, and one hot zone corresponds to one kind of item; and receiving a placing state of an item corresponding to at least one hot zone, wherein the placing state of the item corresponding to the at least one hot zone is determined according to a current image and a standard image of the at least one hot zone in response to the acquisition request, wherein the camera equipment is configured to acquire a current image of a hot zone having an association relationship with the camera equipment.

According to an embodiment of the present disclosure, the above method further includes: setting the one or more association relationships; and/or displaying the placing state of the item corresponding to one or more of the at least one hot zone; and/or filtering, according to a filtering condition input by a user, from the placing state of the item corresponding to the at least one hot zone, to obtain a placing state of an item corresponding to one or more hot zones and matching the filtering condition, wherein the filtering condition includes at least one of a camera equipment number, a hot zone number, an item name, and/or a placing state of an item.

According to an embodiment of the present disclosure, the above method further includes: setting a period for the camera equipment to acquire the current image of the hot zone having an association relationship with the camera equipment; and/or setting a period for receiving the placing state of the item corresponding to the at least one hot zone, wherein the period for receiving the placing state of the item corresponding to the at least one hot zone is not shorter than the period for the camera equipment to acquire the current image of the hot zone having an association relationship with the camera equipment.

According to an embodiment of the present disclosure, a placing state of an item corresponding to a hot zone includes a normal state and an abnormal state, and the above method for acquiring an item placing state further includes: sending an alarm signal to a terminal equipment under the case where the placing state of the item corresponding to one or more of the at least one hot zone is an abnormal state.

According to an embodiment of the present disclosure, acquiring of a current image of a hot zone having an association relationship with the camera equipment includes: acquiring a plurality of real-time images of the hot zone having an association relationship with the camera equipment, wherein the plurality of real-time images are continuously acquired according to a time interval; identifying the plurality of real-time images to obtain quantity of items included in the plurality of real-time images; and determining the current image of the hot zone having an association relationship with the camera equipment, wherein the current image is a real-time image having the largest quantity of items included in the plurality of real-time images, wherein the camera equipment has an association relationship with one or more hot zones.

According to another aspect of the present disclosure, there is provided a processing method, including: receiving an acquisition request, wherein the acquisition request includes one or more association relationships, each of the association relationships includes an association relationship between a hot zone and a camera equipment, and one hot zone corresponds to one kind of item; acquiring a current image and a standard image of at least one hot zone in response to the acquisition request; and determining a placing state of an item corresponding to the at least one hot zone according to the current image and the standard image of the at least one hot zone, wherein the camera equipment is configured to acquire a current image of a hot zone having an association relationship with the camera equipment.

According to an embodiment of the present disclosure, determining a placing state of an item corresponding to the at least one hot zone according to the current image and the standard image of the at least one hot zone includes: identifying the current image of the at least one hot zone to obtain an image feature included in the current image of the at least one hot zone; determining an item feature corresponding to the at least one hot zone based on the image feature included in the current image of the at least one hot zone; and comparing the item feature corresponding to the at least one hot zone with a standard item feature corresponding to the at least one hot zone to determine the placing state of the item corresponding to the at least one hot zone, wherein the standard item feature corresponding to the at least one hot zone is obtained based on the standard image of the at least one hot zone.

According to an embodiment of the present disclosure, a placing state of an item corresponding to a hot zone includes a normal state and an abnormal state, and the abnormal state includes at least one of: among item features corresponding to the hot zone, there is existed an item name which is different from a standard item name out of corresponding standard item features; among item features corresponding to the hot zone, a ratio of quantity of items corresponding to an item name which is the same as a standard item name out of corresponding standard item features, to quantity of standard items corresponding to the standard item name is less than a first ratio; or among item identifications corresponding to an item name out of item features corresponding to the hot zone, wherein the item name out of the item features is the same as a standard item name out of corresponding standard item features, a ratio of quantity of item identifications which has a similarity with a standard item identification corresponding to the standard item name lower than a pre-set similarity, to the total quantity of the item identifications corresponding to the item name is greater than a second ratio, wherein the item feature includes at least one of an item name, quantity of items corresponding to the item name, an item identification corresponding to the item name, and/or an item location corresponding to the item name.

According to an embodiment of the present disclosure, acquiring of a current image of a hot zone having an association relationship with the camera equipment includes: acquiring a plurality of real-time images of the hot zone having an association relationship with the camera equipment, wherein the plurality of real-time images are continuously acquired according to a time interval; identifying the plurality of real-time images to obtain quantity of items included in the plurality of real-time images; and determining the current image of a hot zone having an association relationship with the camera equipment, wherein the current image is a real-time image having the largest quantity of items included in the plurality of real-time images, wherein the camera equipment has an association relationship with one or more hot zones.

According to another aspect of the present disclosure, there is provided a system for acquiring an item placing state capable of interacting with a processing system, including an acquisition request sending module configured to send an acquisition request, wherein the acquisition request includes one or more association relationships, each of the association relationships includes an association relationship between a hot zone and a camera equipment, and one hot zone corresponds to one kind of item; and a placing state receiving module configured to receive a placing state of an item corresponding to at least one hot zone, wherein the placing state of the item corresponding to the at least one hot zone is determined by the processing system according to a current image and a standard image of the at least one hot zone in response to the acquisition request, wherein the camera equipment is configured to acquire a current image of a hot zone having an association relationship with the camera equipment.

According to an embodiment of the present disclosure, the above system further includes a parameter setting module configured to set the one or more association relationships; and/or a displaying module configured to display the placing state of the item corresponding to one or more of the at least one hot zone; and/or a filtering module configured to filter, according to a filtering condition input by a user, from the placing state of the item corresponding to the at least one hot zone, to obtain a placing state of an item corresponding to one or more hot zones and matching the filtering condition, wherein the filtering condition includes at least one of a camera equipment number, a hot zone number, an item name, and/or a placing state of an item.

According to an embodiment of the present disclosure, the parameter setting module is further configured to set a period for the camera equipment to acquire the current image of the hot zone having an association relationship with the camera equipment; and/or the placing state receiving module is further configured to set a period for receiving the placing state of the item corresponding to the at least one hot zone, wherein the period for receiving the placing state of the item corresponding to the at least one hot zone is not shorter than the period for the camera equipment to acquire the current image of the hot zone having an association relationship with the camera equipment.

According to an embodiment of the present disclosure, the placing state of the item corresponding to the at least one hot zone includes a normal state and an abnormal state, and the system for acquiring an item placing state further includes an alarming module configured to send an alarm signal to a terminal equipment under the case where the placing state of the item corresponding to one or more of the at least one hot zone is an abnormal state.

According to an embodiment of the present disclosure, acquiring of a current image of a hot zone having an association relationship with the camera equipment includes: acquiring a plurality of real-time images of the hot zone having an association relationship with the camera equipment, wherein the plurality of real-time images are continuously acquired according to a time interval; identifying the plurality of real-time images to obtain quantity of items included in the plurality of real-time images; and determining the current image of the hot zone having an association relationship with the camera equipment, wherein the current image is a real-time image having the largest quantity of items included in the plurality of real-time images, wherein the camera equipment has an association relationship with one or more hot zones.

According to another aspect of the present disclosure, there is provided a processing system capable of interacting with a system for acquiring an item placing state, including an acquisition request receiving module configured to receive an acquisition request sent by the system for acquiring an item placing state, wherein the acquisition request includes one or more association relationships, each of the association relationships includes an association relationship between a hot zone and a camera equipment, and one hot zone corresponds to one kind of item; an image acquiring module configured to acquire a current image and a standard image of at least one hot zone in response to the acquisition request; and a placing state determining module configured to determine a placing state of an item corresponding to the at least one hot zone according to the current image and the standard image of the at least one hot zone, wherein the camera equipment is configured to acquire a current image of a hot zone having an association relationship with the camera equipment.

According to an embodiment of the present disclosure, the placing state determining module includes an image feature identifying sub-module configured to identify the current image of the at least one hot zone to obtain an image feature included in the current image of the at least one hot zone; an item feature determining sub-module configured to determine an item feature corresponding to the at least one hot zone based on the image feature included in the current image of the at least one hot zone; and a placing state determining sub-module configured to compare the item feature corresponding to the at least one hot zone with a standard item feature corresponding to the at least one hot zone to determine the placing state of the item corresponding to the at least one hot zone, wherein the standard item feature corresponding to the at least one hot zone is obtained based on the standard image of the at least one hot zone.

According to an embodiment of the present disclosure, the placing state of the item includes a normal state and an abnormal state, and the abnormal state includes at least one of: among item features corresponding to the hot zone, there is existed an item name which is different from a standard item name out of corresponding standard item features; among item features corresponding to the hot zone, a ratio of quantity of items corresponding to an item name which is the same as a standard item name out of corresponding standard item features, to quantity of standard items corresponding to the standard item name is less than a first ratio; or among item identifications corresponding to an item name out of item features corresponding to the hot zone, wherein the item name out of the item features is the same as a standard item name out of corresponding standard item features, a ratio of quantity of item identifications which has a similarity with a standard item identification corresponding to the standard item name lower than a pre-set similarity, to the total quantity of the item identifications corresponding to the item name is greater than a second ratio, wherein the item feature includes at least one of an item name, quantity of items corresponding to the item name, an item identification corresponding to the item name, and/or an item location corresponding to the item name.

According to an embodiment of the present disclosure, the processing system is a cloud system; and/or the system further includes: an image storing module configured to store the current image of the hot zone having an association relationship with the camera equipment acquired by the camera equipment and the standard image of the at least one hot zone, for an acquisition by the image acquiring module.

According to an embodiment of the present disclosure, acquiring of a current image of a hot zone having an association relationship with the camera equipment includes: acquiring a plurality of real-time images of the hot zone having an association relationship with the camera equipment, wherein the plurality of real-time images are continuously acquired according to a time interval; identifying the plurality of real-time images to obtain quantity of items included in the plurality of real-time images; and determining the current image of a hot zone having an association relationship with the camera equipment, wherein the current image is a real-time image having the largest quantity of items included in the plurality of real-time images, wherein the camera equipment has an association relationship with one or more hot zones.

According to another aspect of the present disclosure, there is provided an electronic device, including: one or more processors; a storage configured to store one or more programs, wherein the one or more programs, when executed by the one or more processors, cause the one or more processors to perform the above method for acquiring an item placing state.

According to another aspect of the present disclosure, there is provided an electronic device, including: one or more processors; a storage configured to store one or more programs, wherein the one or more programs, when executed by the one or more processors, cause the one or more processors to perform the above processing method.

According to another aspect of the present disclosure, there is provided a nonvolatile storage medium, the nonvolatile storage medium or computer readable medium having executable instructions stored thereon, wherein the instructions, when executed, are used to implement the above method for acquiring an item placing state.

According to another aspect of the present disclosure, there is provided a nonvolatile storage medium, the nonvolatile storage medium or computer readable medium having executable instructions stored thereon, wherein the instructions, when executed, are used to implement the above processing method.

According to the embodiments of the present disclosure, the defect of high tally cost caused by an acquisition of the item placing state through manual inspection and the defect of tally delay caused by an acquisition of the item placing state not in real time may be at least partially avoided, thus an automatic acquisition of the item placing state in real time may be achieved, to improve tally efficiency, improve tally timeliness and reduce labor cost of tally.

BRIEF DESCRIPTION OF THE ACCOMPANYING DRAWINGS

The above and additional objectives, features and advantages of the present disclosure will become more obvious from the following description of the embodiments in conjunction with the accompanying drawings, in which:

FIG. 4 shows a schematic displaying screen obtained according to the method for acquiring an item placing state described with reference to FIG. 3A;

FIGS. 8A to 8C show schematic diagrams of an item placing state being an abnormal state according to an embodiment of the present disclosure;

DETAILED DESCRIPTION

Figure 1:
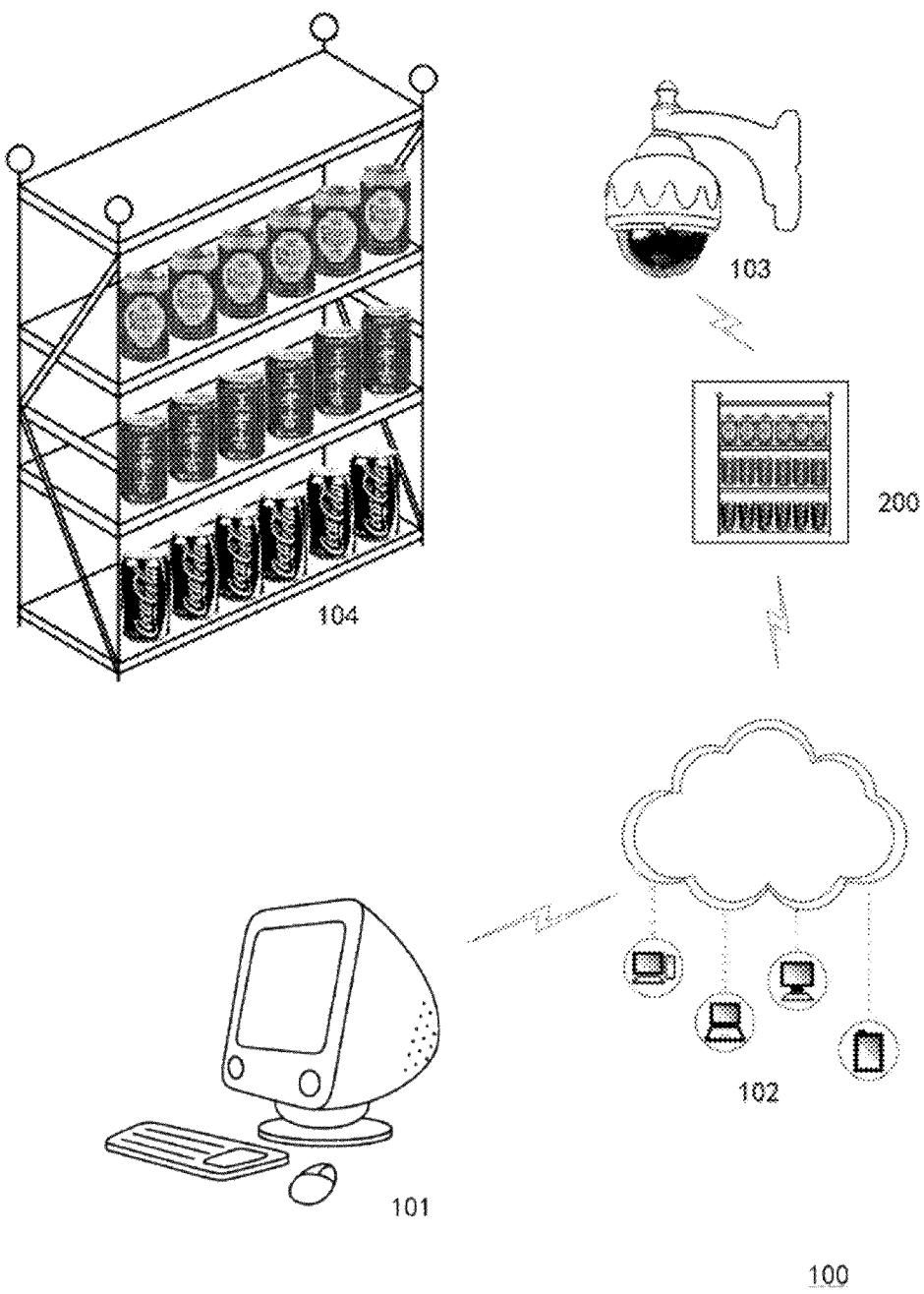
FIG. 1 shows a schematic application scenario of a method and a system for acquiring an item placing state according to an embodiment of the present disclosure.

Embodiments of the present disclosure will be described with reference to the drawings below. However, it should be understood that this description is only exemplary and is not intended to limit the scope of the present disclosure. In the following detailed description, for ease of explanation, many specific details are set forth to provide a comprehensive understanding of the embodiments of the present disclosure. However, obviously, one or more embodiments may also be implemented without these specific details. In addition, in the following, descriptions of well-known structures and technology are omitted to avoid unnecessarily obscuring the concept of the present disclosure.

The terms used herein are only for describing specific embodiments, and are not intended to limit the present disclosure. The terms "comprising", "including", etc. used herein indicate presence of the features, steps, operations and/or components described, but do not exclude presence or addition of one or more other features, steps, operations or components.

All terms used herein (including technical and scientific terms) have meanings commonly understood by those skilled in the art, unless otherwise defined. It should be noted that the terms used herein should be interpreted as having meanings consistent with the context of this specification, and should not be explained in an idealized or overly rigid manner.

In the case where an expression similar to "at least one of A, B, C, etc." is used, generally speaking, it should be interpreted according to the meaning of the expression commonly understood by those skilled in the art (for example, "a system with at least one of A, B and C" should include but is not limited to systems with A alone, B alone, C alone, with A and B, A and C, B and C, and/or a system with A, B, C, etc.). In the case where an expression similar to "at least one of A, B, or C, etc." is used, generally speaking, it should be interpreted according to the meaning of the expression commonly understood by those skilled in the art (for example, "a system with at least one of A, B or C" should include but is not limited to systems with A alone, B alone, C alone, with A and B, A and C, B and C, and/or a system with A, B, C, etc.). Those skilled in the art should also understand that essentially any adversative conjunctions and/or phrases representing two or more optional items, whether in the specification, claims or drawings, should be understood to include the possibilities of one of these items, any of these items, or two items. For example, the phrase "A or B" should be understood to include the possibilities of "A" or "B", or "A and B".

The embodiment of the present disclosure provides a method for acquiring an item placing state. The method includes sending an acquisition request. The acquisition request includes one or more association relationships, and each of the association relationships includes an association relationship between a hot zone and a camera equipment. One hot zone corresponds to one kind of item. The method also includes receiving a placing state of an item corresponding to at least one hot zone. The placing state of the item corresponding to at least one hot zone is determined according to a current image and a standard image of the at least one hot zone in response to the acquisition request. Herein, the camera equipment is configured to acquire the current image of the hot zone having an association relationship with the camera equipment.

The embodiment of the present disclosure further provides a processing method. The method includes receiving an acquisition request. The acquisition request includes one or more association relationships, and each of the association relationships includes an association relationship between a hot zone and a camera equipment. One hot zone corresponds to one kind of item. The method also includes acquiring a current image and a standard image of at least one hot zone in response to the acquisition request, and determining a placing state of an item corresponding to the at least one hot zone according to the current image and the standard image of the at least one hot zone. Herein, the camera equipment is configured to acquire the current image of the hot zone having an association relationship with the camera equipment.

FIG. 1 shows a schematic application scenario of a method and a system for acquiring an item placing state according to an embodiment of the present disclosure. It should be noted that FIG. 1 is only an example of an application scenario where the embodiment of the present disclosure may be applied, so as to help those skilled in the art understand technical contents of the present disclosure, but it does not mean that the embodiment of the present disclosure cannot be used in other devices, systems, environments or scenarios.

As shown in FIG. 1, an application scenario 100 according to the embodiment includes a terminal equipment 101, a cloud system 102, a camera equipment 103, and a shelf 104. The camera equipment 103 and the cloud system 102, the cloud system 102 and the terminal equipment 101, or the camera equipment 103 and the terminal equipment 101 are connected through a medium of a communication link. This connection may include various connection types, such as a wired or a wireless communication link or a fiber optic cable, etc.

The terminal equipment 101 may interact with the cloud system 102 to receive an item placing state, etc. On the terminal equipment 101, there may installed various operation applications, to send an acquisition request to the cloud system 102. The terminal equipment 101 may also interact with the camera equipment 103, to adjust a shooting frequency of the camera equipment 103.

The terminal equipment 101 may be any electronic device having a display, so as to show an item placing state to a user, including but not limited to a desktop computer, a portable laptop computer, a tablet, a smart phone, etc.

According to an embodiment of the present disclosure, the terminal equipment 101 may further for example acquire a current image 200 of the shelf (a current image including a hot zone) shot by the camera equipment 103 and stored in the cloud system 102, and a standard image of the shelf (a standard image including the hot zone) for display by interacting with the cloud system 102, so as to better display the placing state of the item corresponding to each hot zone on the shelf 104.

According to an embodiment of the present disclosure, a hot zone corresponds to an area having the same merchandise placed on the shelf 104. For the shelf 104 in FIG. 1, the hot zone may be for example an area having merchandise "Coca-Cola" placed at the bottom of the shelf 104. It can be understood that above description of the hot zone is only used as an example to better understand the present disclosure, which is not limited by the present disclosure.

The cloud system 102 may be a virtual terminal equipment (such as a virtual personal computer, etc.) at cloud having storage and calculation functions, to store the current image 200 of the shelf 104 shot by the camera equipment 103 and the standard image of the shelf, and in response to the acquisition request from the terminal equipment 101, to process and analyze the current image and the standard image to obtain placing states of items in one or more hot zones on the shelf 104 (only as an example).

As an example, the cloud system 102 further has an image processing function to mark and obtain an area corresponding to the hot zone in the current image of the shelf shot by the camera equipment 103, according to a coordinate range of an area corresponding to the hot zone in the standard image.

As an example, the camera equipment 103 may communicate with the cloud system 102 by using a set communication protocol, and the camera equipment 103 may be a terminal equipment having a shooting function for shooting a real-time image of the shelf 104, and may send a shot image 200 to the cloud system 102 to store the shot image 200 in the cloud system 102.

According to an embodiment of the present disclosure, the camera equipment 103 may be also for example a camera equipment 103 having a calculation processing function. The camera equipment 103 may continuously capture the shelf 104 at an interval to obtain a plurality of real-time images, then the camera equipment may perform identification processing on the plurality of real-time images using the calculation processing function, to filter a best image from the plurality of real-time images as the current image (the current image including the shelf of the hot zone). According to an embodiment of the present disclosure, the camera equipment 103 may also has for example an image processing function similar to a cloud system.

According to an embodiment of the present disclosure, the camera equipment 103 may be for example a camera equipment such as a monitoring camera having a real-time or a periodic shooting function, to acquire an image of the shelf 104 in real time or periodically, so as to obtain an image of the shelf 104 (an image including one or more hot zones the shelf 104 includes) in real time or periodically.

It should be noted that, generally, the method for acquiring an item placing state provided in the embodiments of the present disclosure may be performed by the terminal equipment 101. Correspondingly, the system for acquiring an item placing state provided in the embodiments of the present disclosure may generally be set in the terminal equipment 101.

According to an embodiment of the present disclosure, with reference to the application scenario in FIG. 1, the cloud system 102 may also be excluded, and the camera equipment 103 may communicate with the terminal equipment 101. The terminal equipment 101 also has storage and calculation functions, to store the current image 200 of the shelf 104 (the current image including the hot zone) and the standard image of the shelf 104 (the standard image including the hot zone) shot by the camera equipment 103, and analyze and identify the current image 200 and the standard image to obtain the placing state of the item in one or more hot zones the shelf 104 includes.

It can be understood that the number and the type of the terminal equipment, the cloud system, the camera equipment, the shelf, and items placed on the shelf in FIG. 1 are only illustrative. According to implementation needs, there can be any number and any types of terminal equipment, cloud system, camera equipment, shelves and items placed.

Figure 2A:
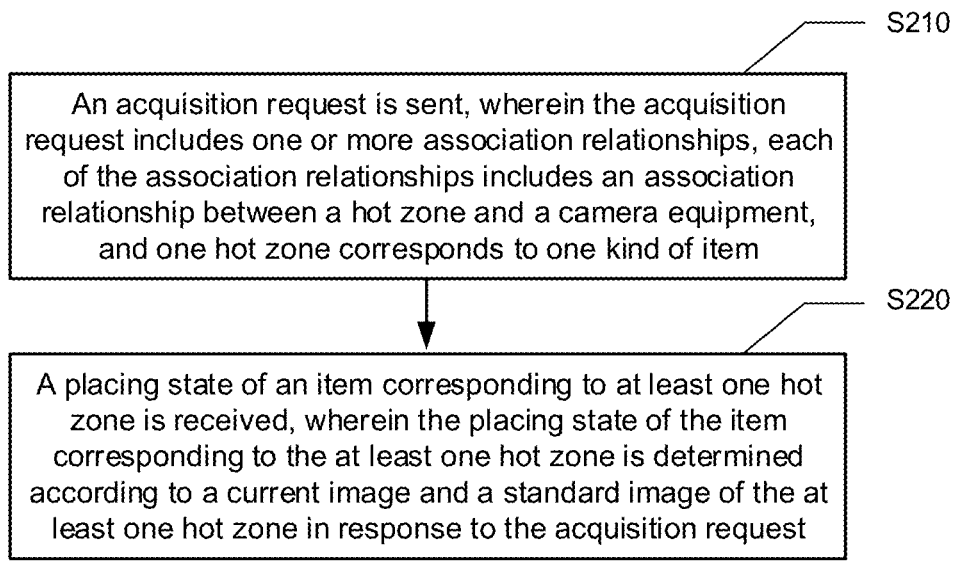
FIGS. 2A to 2B show schematic flowcharts of a method for acquiring an item placing state according to an embodiment of the present disclosure.
Figure 2B:
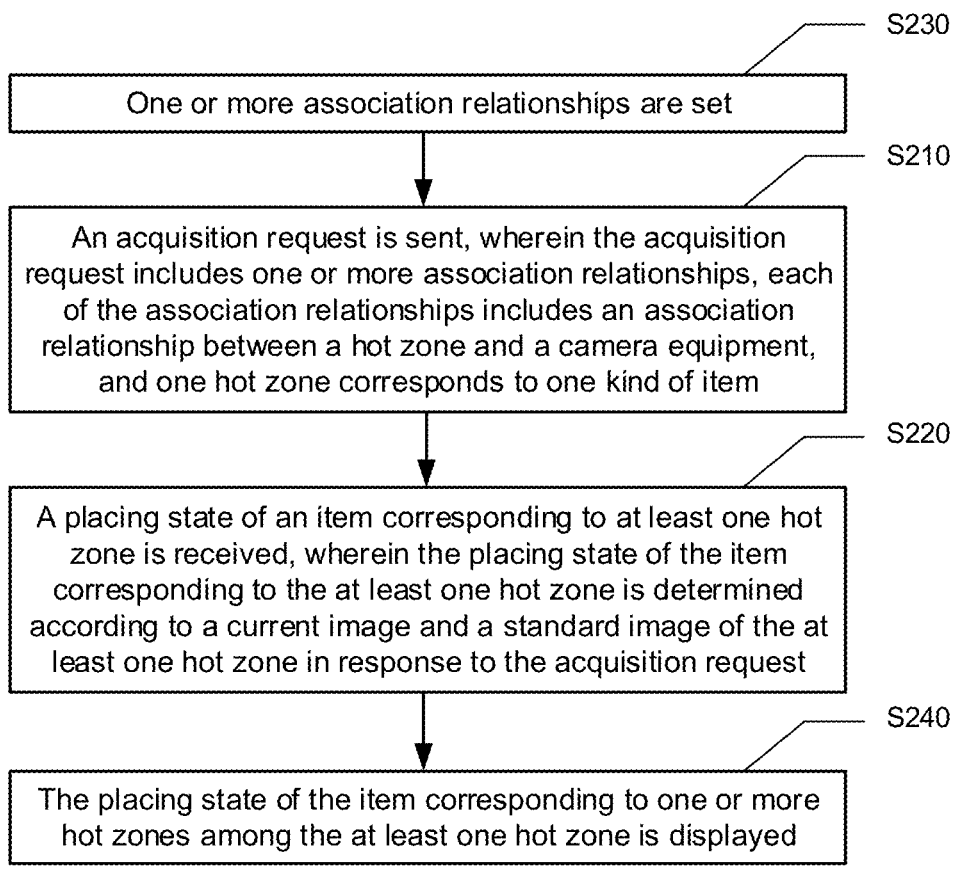

FIGS. 2A to 2B show schematic flowcharts of a method for acquiring an item placing state according to an embodiment of the present disclosure.

As shown in FIG. 2A, the method for acquiring an item placing state includes operations S210 to S220.

In an operation S210, an acquisition request is sent, wherein the acquisition request includes one or more association relationships, each of the association relationships includes an association relationship between a hot zone and a camera equipment, and one hot zone corresponds to one kind of item.

Herein, the one or more association relationships may be for example preset. As shown in FIG. 2B, the method may further include an operation S230, in which the one or more association relationships are set. As an example, an operation S230 may be performed before an operation S210.

According to an embodiment of the present disclosure, the hot zone may be an area having the same kind of items placed on the shelf 104, and the camera equipment may be a camera equipment used for acquiring the current image of the hot zone having an association relationship with the camera equipment. Specifically, for example, the camera equipment may be the camera equipment 103 used for acquiring the current image of the shelf 104 where the hot zone having an association relationship with the camera equipment 103 is located.

According to an embodiment of the present disclosure, the camera equipment 103 may be for example located in the same space with the shelf 104 having a preset hot zone. Specifically, for example, the camera equipment 103 may be arranged on a wall opposite to the shelf 104, on another shelf opposite to the shelf 104, or on a top wall of a space where the shelf 104 is located, so as to shoot a real-time image of the shelf 104. The shot real-time image of the shelf 104 includes a real-time image of the hot zone the shelf 104 includes, and therefore also includes a current image of the hot zone the shelf 104 includes.

According to an embodiment of the present disclosure, the camera equipment may acquire the current image of the hot zone having an association relationship with the camera equipment (specifically, for example, may shoot the current image of the shelf where the hot zone is located) when the terminal equipment 101 sends a shooting instruction to the camera equipment in response to a user's operation, or the camera equipment may periodically acquire the current image of the hot zone having an association relationship with the camera equipment according to a set period. For example, the period may be set through the terminal equipment 101. The method for acquiring an item placing state may further include a corresponding operation: setting a period for the camera equipment to acquire the current image of the hot zone having an association relationship with the camera equipment, wherein the period set for acquiring may be, for example, 5 min.

According to an embodiment of the present disclosure, the acquisition request may be sent by the terminal equipment 101 in response to a user's operation, or sent according to a preset period, so as to periodically receive the placing state of the item corresponding to at least one hot zone. The method for acquiring an item placing state may further include a corresponding operation: setting a period for receiving the placing state of the item corresponding to at least one hot zone, wherein the period set for receiving may be the same 5 min as the period for acquiring.

According to an embodiment of the present disclosure, the period for receiving the placing state of the item corresponding to the at least one hot zone is not shorter than the period for the camera equipment to acquire the current image of the hot zone having an association relationship with the camera equipment, thereby ensuring the placing state of the item corresponding to the hot zone received by using the method for acquiring an item placing state is updated in real time according to the state of the item placed in the hot zone.

According to an embodiment of the present disclosure, the one or more association relationships may be set by the user by using the terminal equipment 101. Specifically, a process of setting the association relationship between the hot zone and the camera equipment may be for example a process of binding camera equipment information and hot zone information by using the terminal equipment 101.

Herein, the camera equipment information may for example include a camera equipment number, a camera equipment model, and/or a camera equipment manufacturer, etc., and the hot zone information may for example include a hot zone number and item information (for example, an item name, an item number, etc.) placed in the hot zone.

According to an embodiment of the present disclosure, specifically, setting the association relationship between the hot zone and the camera equipment may also be for example registering the camera equipment, the shelf, and the hot zone sequentially by using the terminal equipment 101.

Herein, a process of registering the camera equipment may be for example a process of filling in camera equipment information (for example, a camera equipment number, a camera equipment model, and/or a camera equipment manufacturer, etc.).

A process of registering the shelf may for example include filling in shelf information first (for example, a shelf number and a camera equipment number may be included, and a store name where the shelf is located, a shelf length, a shelf width, etc. may also be included), and then determining whether a standard image of the shelf exists in the cloud system or the terminal equipment 101 locally. If the standard image of the shelf exists, a registration of the shelf is completed. If the standard image of the shelf doesn't exist, placing of the items on the shelf or a shooting angle for the camera equipment is readjusted, and then whether a real-time image of the shelf re-shot by the camera equipment is a standard image will be confirmed, and the registration of the shelf may be completed till after an existence of the standard image of the shelf is confirmed.

A process of registering the hot zone may for example include: filling in the shelf information first, and then determining whether a registration of a shelf corresponding to the shelf information is completed. If the registration of the shelf is completed, a standard image of the shelf may be read, and an area range corresponding to the hot zone may be marked in the standard image and the hot zone information (for example, a hot zone number, a name and/or a number of the item placed in the hot zone, user information such as a name of a person in charge of the hot zone, etc.) may be filled in. If the registration of the shelf is not completed, the process of registering the shelf will be returned, and then the process of registering the hot zone will be performed again.

In summary, by performing registration processes in above embodiments, binding between the camera equipment, the shelf and the hot zone can be achieved, so that setting an association relationship between the hot zone and the camera equipment is achieved. It can be understood that the method for setting the association relationship between the hot zone and the camera equipment is only used as an example to facilitate understanding the present disclosure, which is not limited by the present disclosure.

According to an embodiment of the present disclosure, the standard image of the shelf mentioned above may be for example an image meeting a requirement and shot at a specific moment by the camera equipment. The standard image may be an image shot and obtained when the shelf has just been filled with items, and placing of the items meets a standard condition (placing of the items is at an angle, from which an item identification of the item placed is fully exposed to the camera equipment). Specifically, for example, the terminal equipment 101 may acquire images of the shelf shot in a plurality of time periods from the cloud system 102 and/or the camera equipment 103 and display them to the user. The user may select an image from the images of the shelf shot in a plurality of time periods as the standard image of the shelf, and may upload the standard image of the shelf to the cloud system 102. As an example, the standard image of the shelf may also be the image filtered by the cloud system 102 from the images of the shelf shot in a plurality of time periods, according to a preset standard.

According to an embodiment of the present disclosure, the one or more association relationships included in the acquisition request and the current image of the hot zone having an association relationship with the camera equipment acquired by the camera equipment 103 are capable of providing conditions for acquiring the placing state of the item corresponding to at least one hot zone.

In an operation S220, a placing state of an item corresponding to at least one hot zone is received, wherein the placing state of the item corresponding to the at least one hot zone is determined according to a current image and a standard image of the at least one hot zone in response to the acquisition request.

According to an embodiment of the present disclosure, the standard image of the hot zone mentioned above may be for example an image of an area corresponding to the hot zone among standard images of the shelf. In the standard image of the hot zone, items placed in the hot zone satisfy a standard condition: it is filled with items and an item identification is fully exposed to the camera equipment.

According to an embodiment of the present disclosure, the current image of the hot zone may be for example an image including an area corresponding to the hot zone in the current image of the shelf. The placing state of the item may be determined for example according to the current image of the shelf and the standard image of the shelf, and the current image of the shelf may be obtained by filtering from a plurality of real-time images of the shelf.

According to an embodiment of the present disclosure, the current image of the hot zone may also be obtained specifically through the following ways. According to a coordinate range of an area corresponding to the hot zone marked in the standard image of the shelf 104 when registering the hot zone, an image of an area corresponding to the coordinate range is obtained by dividing the current image of the shelf 104, and the image obtained through this division is the current image of the hot zone. Then as an example, the placing state of the item may be determined specifically according to the current image of the hot zone obtained through the division and the standard image of the hot zone. It can be understood that the current image of the hot zone may be obtained for example through the camera equipment 103 having an image processing function, and may also be obtained through the cloud system 102, or through the terminal equipment 101, which is not limited in the present disclosure. According to an embodiment of the present disclosure, for example, the current image of the hot zone may also be obtained by filtering from a plurality of real-time images.

According to an embodiment of the present disclosure, the placing state of the item received corresponding to the hot zone may include for example a normal state and an abnormal state. Herein, for example, determining the placing state of the item according to the current image and the standard image of the at least one hot zone in response to the acquisition request may include following steps. First, the current image and the standard image of the hot zone are identified to obtain an image feature currently included in the hot zone and a standard image feature included in the hot zone. Then, an item feature and a standard item feature corresponding to the hot zone are obtained according to the image feature and the standard image feature, and the placing state of the item is determined by comparing the item feature with the standard item feature corresponding to the hot zone. Herein, the normal state may be for example a state where a comparison result of the item feature and the standard item feature corresponding to the hot zone satisfies a plurality of preset conditions, and the abnormal state may be for example a state where a comparison result of the item feature and the standard item feature corresponding to the hot zone does not satisfy any of the plurality of preset conditions.

According to an embodiment of the present disclosure, the item feature and the standard item feature corresponding to the hot zone may also be obtained for example through the following ways. The standard image feature obtained from the standard image of the hot zone and the image feature obtained from the current image of the hot zone are used as an input, and the item feature and the standard item feature corresponding to the hot zone are obtained by using a pre-trained model. For example, the item feature corresponding to the hot zone may include an item name, quantity of items corresponding to the item name, an item identification and/or an item location (i.e., a coordinate location in the current image of the hot zone) corresponding to the item name. Correspondingly, for example, the standard item feature may include a standard item name, quantity of items corresponding to the standard item name, an item identification and/or a standard item location (i.e., a coordinate location in the standard image of the hot zone) corresponding to the standard item name.

According to an embodiment of the present disclosure, the item feature corresponding to the hot zone may also be obtained for example through the following ways. Image features obtained from the current image of the shelf the hot zone pertains and a coordinate range of the hot zone in the standard image of the shelf the hot zone pertains are used as an input, and an item feature in the coordinate range in the real-time image of the shelf is obtained by using a pre-trained model, which is the item feature corresponding to the hot zone. Correspondingly, the standard item feature corresponding to the hot zone may be obtained for example through the following ways. Areas corresponding to one or more hot zones are marked in advance in the standard image of the shelf the hot zone pertains, and the standard image being marked is used as an input, and an item feature corresponding to the one or more hot zones in the standard image of the shelf is obtained by using a pre-trained model.

According to an embodiment of the present disclosure, as shown in FIG. 2B, the method for acquiring an item placing state may further include for example an operation S240. In the operation S240, the placing state of the item corresponding to one or more hot zones among the at least one hot zone is displayed.

According to an embodiment of the present disclosure, the terminal equipment 101 may have a display, the method for acquiring an item placing state may be performed by the terminal equipment 101, and the placing state of the item corresponding to one or more hot zones is displayed through the display of the terminal equipment 101, so that a user can learn in real time the state of items placed in each hot zone on the shelf according to content displayed.

According to an embodiment of the present disclosure, the display of the terminal equipment 101 may further display for example at least one of a name of a store where the shelf the hot zone pertains is placed, a shelf number of the shelf the hot zone pertains, a hot zone number, an item name, an item number, and a standard image of the hot zone, a real-time image of the hot zone, and user information (for example, a name of a person in charge of the hot zone), etc.

In summary, in the method for acquiring an item placing state of the embodiment of the present disclosure, by sending an acquisition request, the placing state of the item corresponding to the hot zone may be received, so as to learn the placing state of the item periodically or in real time for the user judging whether a tally is required. Since according to the method, the user is not required to inspect the area where the shelf the hot zone pertains is located, it is possible to effectively improve an efficiency of tally, avoid defects of serious delay and poor timeliness in a usual tally, and reduce a tally cost. Furthermore, since the placing state of the item is acquired based on the standard image and the current image of the hot zone, without a user's judgment through tally experience, a tally accuracy may be improved to a certain extent.

Figure 3A:
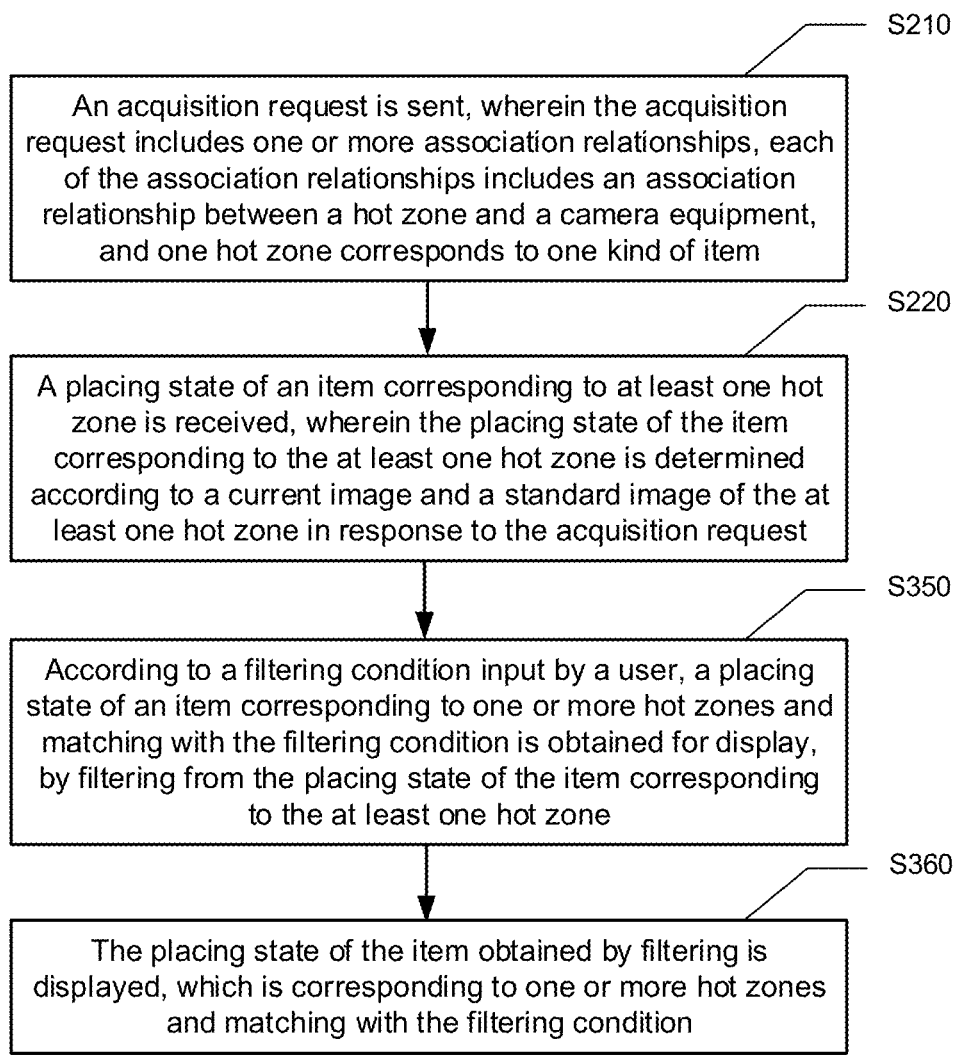
FIGS. 3A to 3B show schematic flowcharts of a method for acquiring an item placing state according to another embodiment of the present disclosure.
Figure 3B:
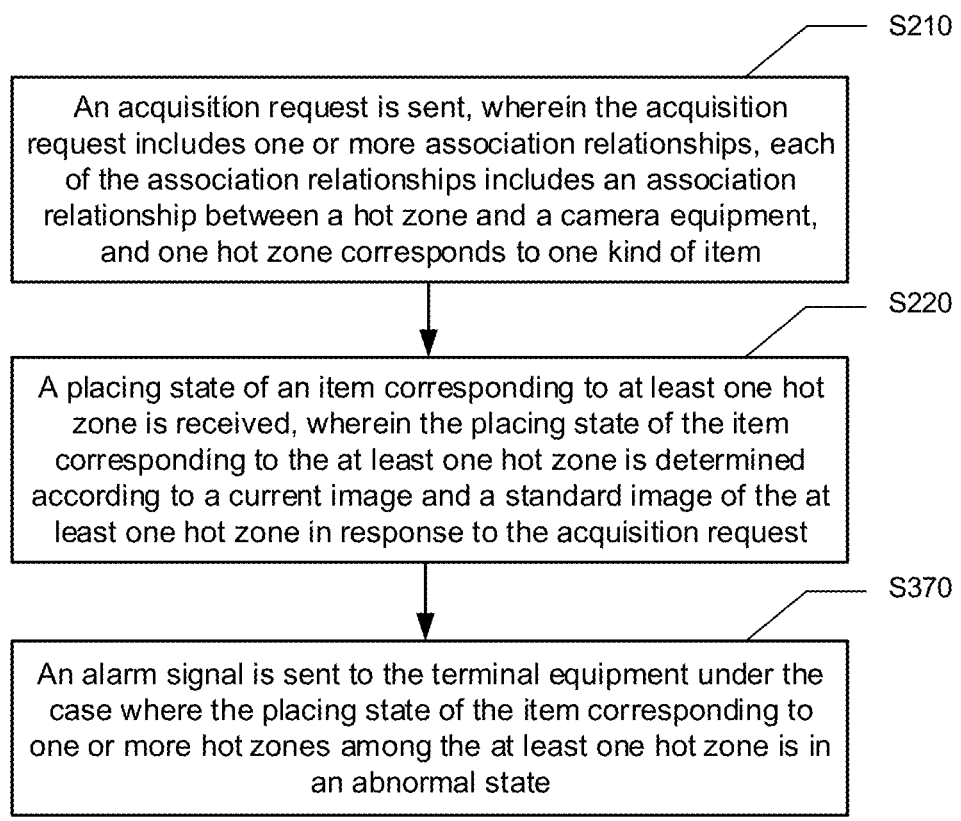

FIGS. 3A to 3B show schematic flowcharts of a method for acquiring an item placing state according to another embodiment of the present disclosure. FIG. 4 shows a schematic displaying screen obtained according to the method for acquiring an item placing state described with reference to FIG. 3A.

As shown in FIG. 3A, in addition to operations S210 to S220 described with reference to FIG. 2A, the method for acquiring an item placing state may also include operations S350 and S360.

According to an embodiment of the present disclosure, for example, an operation S350 may be performed after operation S220, or performed when a user inputs a filtering condition.

In the operation S350, according to a filtering condition input by a user, a placing state of an item corresponding to one or more hot zones and matching with the filtering condition is obtained for display, by filtering from the placing state of the item corresponding to the at least one hot zone. Correspondingly, in an operation S360, the placing state of the item obtained by filtering is displayed, which is corresponding to one or more hot zones and matching with the filtering condition.

According to an embodiment of the present disclosure, the terminal equipment having a display may also display for example a filtering condition inputting window, so as to facilitate inputting the filtering condition by the user. As an example, the filtering condition may include at least one of a camera equipment number, a hot zone number, an item name, and/or a placing state of an item. Under the case where a user inputs a camera equipment number, a filtering result of operation S350 is a placing state of an item corresponding to all hot zones having an association relationship with the camera equipment corresponding to the camera equipment number. Under the case where the user inputs an item name, the filtering result of operation S350 is a placing state of an item in all hot zones where the item corresponding to the item name is placed.

According to an embodiment of the present disclosure, for example, the placing state of the item acquired in each time period may be stored in a local storage space (for example, the terminal equipment shown in FIG. 1), then the filtering condition input by the user may further include a time period, and the filtering result of operation S350 is the placing states of all items stored in the local storage space within the time period. If the association relationship between the hot zone and the camera equipment is set by using the registering method mentioned above, the filtering condition input by the user may further include a store name, a shelf number, etc., and the filtering result of operation S350 is a placing state of an item stored in the local storage space, and corresponding to the hot zone included in the store/shelf corresponding to the store name/shelf number. According to an embodiment of the present disclosure, for example, the method for acquiring an item placing state may further periodically clear the placing state stored in the local storage space, so that the local storage space only stores the placing state of the most recent time period, reducing a load of the local storage space.

According to an embodiment of the present disclosure, for actual application scenarios, such as a situation where a user is in charge of the placing state of items in a plurality of hot zones, an association relationship among the user information, the plurality of hot zones and the camera equipment having an association relationship with the plurality of hot zones may also be set. The filtering conditions input by the user may also include the user information and the filtering result of operation S350 is a placing state of an item corresponding to the plurality of hot zones in charge by the user corresponding to the user information. Herein, the user information may include for example a name, a position, and/or an employee number of the person in charge.

It can be understood that the filtering conditions mentioned above are only used as examples, so as to facilitate understanding the present disclosure, and is not limited by the present disclosure. The filtering conditions input may also be two or more of the filtering conditions listed above. For example, the input filtering condition may also be a store name and user information, etc.

According to an embodiment of the present disclosure, the displaying screen obtained by the method for acquiring an item placing state described with reference to FIG. 3A is shown in FIG. 4, and the user may input a filtering condition through the displaying screen in FIG. 4. Specifically, the displaying screen displays a filtering condition option and a displaying result of the placing state of the item, which is obtained by filtering in response to a user's clicking on the "query" control widget after a filtering condition is entered. The placing state of the item may include for example a state of "normal", "out of stock", "irregular" and "misplaced", etc. The specific meaning of these states will be described in the following content.

In summary, in the method for acquiring an item placing state of the embodiment of the present disclosure, the user can input a filtering condition according to needs to flexibly retrieve the placing state of the item she/he is concerned, so that the displaying result is more in line with the user's needs and a user's checking efficiency of the placing state of the item is improved.

As shown in FIG. 3B, in addition to operations S210 to S220 described with reference to FIG. 2A, the method for acquiring an item placing state of the embodiment of the present disclosure may also include for example an operation S370, and the operation S370 may be performed after the operation S220.

In the operation S370, an alarm signal is sent to the terminal equipment under the case where the placing state of the item corresponding to one or more hot zones among the at least one hot zone is in an abnormal state.

According to an embodiment of the present disclosure, the terminal equipment herein may be for example the terminal equipment 101 described with reference to FIG. 1, or a portable electronic device such as a smart phone or a tablet computer. The alarm signal or information may be for example a message sent to the terminal equipment 101, an instruction on playing a specific music or ringtone sent to the terminal equipment, or an instruction on popping up a specific window sent to the terminal equipment, which enables a holder of the terminal equipment to find that the placing state of the item is in an abnormal state, and perform corresponding tally operations according to the abnormal state.

Therefore, by using the method for acquiring an item placing state mentioned above, the user can find in time that the placing state of the item does not meet a requirement or the item is out of stock, so that a tally operation can be performed immediately, thus avoiding defects of poor shopping experience from the customer and sales decrease of the store caused by poor tally timeliness in the prior art.

Figure 5:
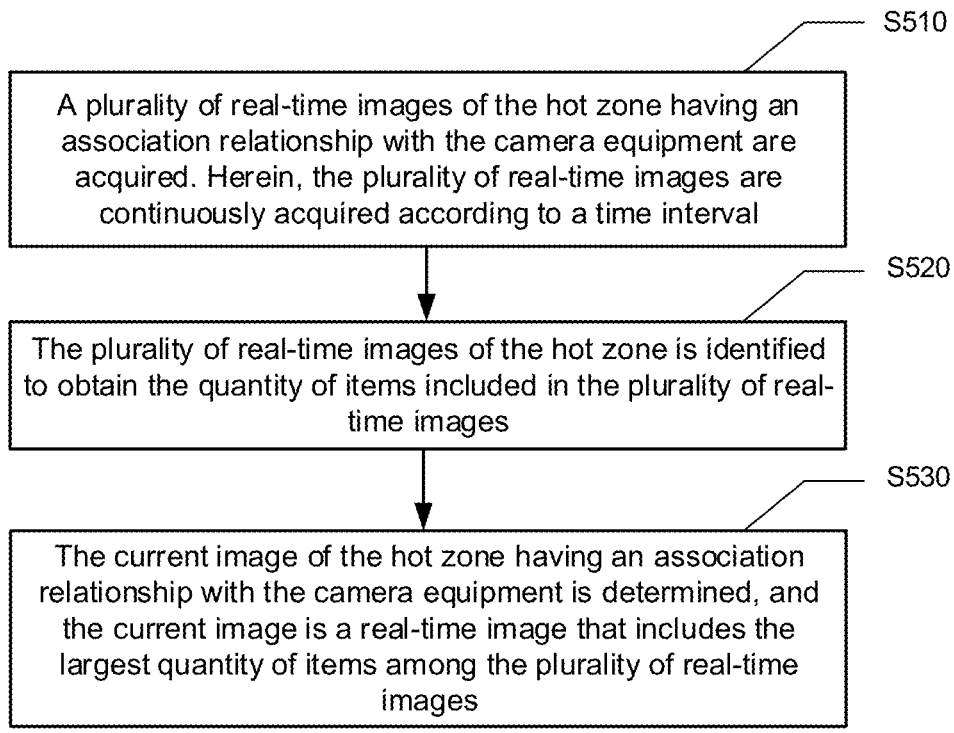
FIG. 5 shows a schematic flowchart of acquiring a current image of a hot zone according to an embodiment of the present disclosure.

FIG. 5 shows a schematic flowchart of acquiring a current image of a hot zone according to an embodiment of the present disclosure.

As shown in FIG. 5, acquiring a current image of the hot zone having an association relationship with the camera equipment includes operations S510 to S530.

In an operation S510, a plurality of real-time images of the hot zone having an association relationship with the camera equipment are acquired. Herein, the plurality of real-time images are continuously acquired according to a time interval.

According to an embodiment of the present disclosure, the operation may be specifically, for example, that the camera equipment continuously acquires a plurality of real-time images of the shelf where the hot zone having an association relationship with the camera equipment is located according to a set time interval, and performs the following operations S520 to S530 by using the plurality of real-time images of the shelf as the plurality of real-time images of the hot zone.

According to an embodiment of the present disclosure, the operation may specifically be, for example, that after a plurality of real-time images of the shelf is acquired, according to a coordinate range in the standard image of the shelf where the hot zone having an association relationship with the camera equipment is located, an image corresponding to the coordinate range is acquired from the plurality of real-time images of the shelf, that is, a plurality of real-time images of the hot zone having an association relationship with the camera equipment is acquired, and the following operations S520 to S530 are performed on the basis of the plurality of real-time images of the hot zone acquired from the plurality of real-time images of the shelf.

According to an embodiment of the present disclosure, a value of the time interval may be any value from 1 to 30 seconds, and the time interval may be set by the terminal equipment 101 with reference to FIG. 1.

In an operation S520, the plurality of real-time images of the hot zone is identified to obtain the quantity of items included in the plurality of real-time images.

According to an embodiment of the present disclosure, identifying the plurality of real-time images of the hot zone may be, for example, performed through an object detection algorithm, so as to obtain the quantity of items included in each of the plurality of real-time images. Specifically, for example, a Faster-RCNN algorithm may be used to detect the items included in the plurality of real-time images. It can be understood that the method for identifying the plurality of real-time images of the hot zone mentioned above is only used as an example to facilitate understanding the present disclosure, and is not limited by the present disclosure.

In an operation S530, the current image of the hot zone having an association relationship with the camera equipment is determined, and the current image is a real-time image that includes the largest quantity of items among the plurality of real-time images.

According to an embodiment of the present disclosure, operations of acquiring the current image mentioned above may be performed by a camera equipment having a data processing function, and an output of the camera equipment is directly the current image of the hot zone having an association relationship with the camera equipment.

According to an embodiment of the present disclosure, since the camera equipment having a processing function is expensive, operations of acquiring the current image mentioned above may also be performed by the cloud system 102 or the terminal equipment 101 described with reference to FIG. 1. Among them, the plurality of real-time images of the shelf is shot by the camera equipment, and the camera equipment may interact with the cloud system 102 or the terminal equipment 101 to send the plurality of real-time images of the shelf shot to the cloud system 102 or the terminal equipment 101, thereby reducing a performing cost of the method for acquiring the placing state of the item to a certain extent.

According to an embodiment of the present disclosure, since a shelf may have various kinds of items to be placed thereon, the shelf may have a plurality of hot zones, and a range of photographable space of the camera equipment is not limited to one hot zone, or even to one shelf. Thus, one camera equipment may have an association relationship with one or more hot zones, and specifically, for example, the camera equipment may establish an association relationship with all pre-set hot zones it shots.

According to an embodiment of the present disclosure, when the camera equipment acquires a real-time image of the shelf, there may be a customer standing in front of the shelf, and some items on the shelf may be occluded by the customer in the real-time image of the shelf shot in such case, therefore, the placing state of the item determined according to the real-time image acquired will be certainly inaccurate. In order to avoid this case, the embodiment of the present disclosure acquires a plurality of real-time images continuously shot by the camera equipment, and selects a real-time image having the largest quantity of items from the plurality of real-time images as the current image for a determination of the placing state of the item, which can improve accuracy of the placing state of the item acquired to a certain extent.

Figure 6:
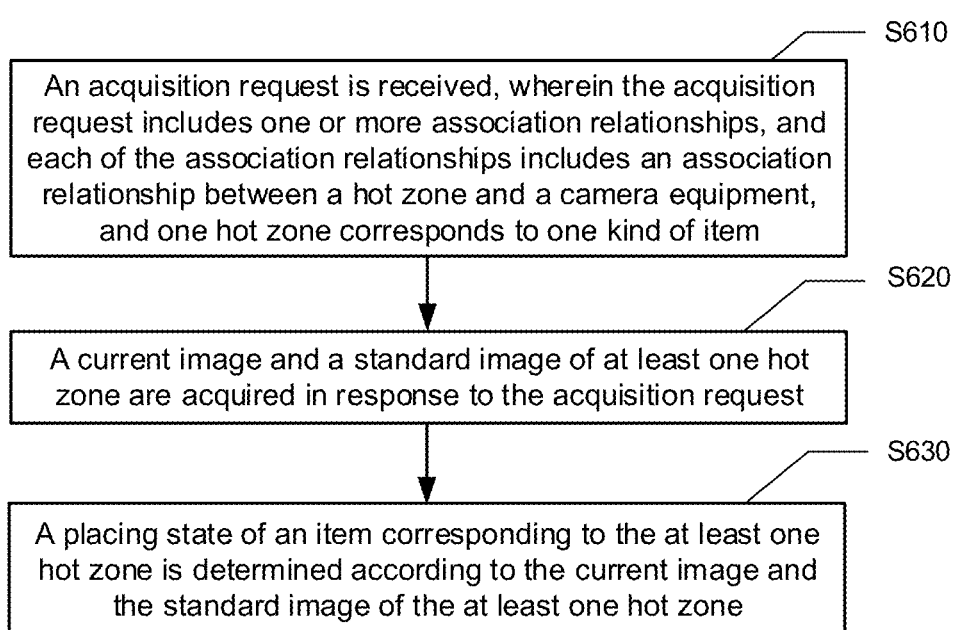
FIG. 6 shows a schematic operation flowchart of a processing method according to an embodiment of the present disclosure.

FIG. 6 shows a schematic operation flowchart of a processing method according to an embodiment of the present disclosure.

As shown in FIG. 6, the processing method includes operations S610 to S630.

In an operation S610, an acquisition request is received, wherein the acquisition request includes one or more association relationships, and each of the association relationships includes an association relationship between a hot zone and a camera equipment, and one hot zone corresponds to one kind of item.

According to an embodiment of the present disclosure, the camera equipment is used to acquire a current image of a hot zone having an association relationship with the camera equipment. According to an embodiment of the present disclosure, specifically, the current image of the hot zone herein may be a current image of the shelf where the hot zone is located, and the current image may be filtered from a plurality of real-time images; or the current image of the hot zone herein may be obtained by dividing the current image of the shelf where the hot zone is located. According to an embodiment of the present disclosure, specifically, the acquisition request may be for example an acquisition request sent with reference to operation S210 in FIG. 2A, and will not be repeated here.

In an operation S620, a current image and a standard image of at least one hot zone are acquired in response to the acquisition request.

According to an embodiment of the present disclosure, the current image and the standard image may be determined from real-time images of the shelf shot by the camera equipment at various time points. Among them, the current image of the hot zone may be obtained through the method for acquiring the current image of the hot zone described with reference to FIG. 5, and the standard image of the hot zone may be for example a real-time image meeting a standard condition obtained by filtering. As an example, the standard condition may be: the quantity of items placed in the hot zone is saturated (filled), and the items are placed in a manner of an item identification fully exposed to the camera equipment.

According to an embodiment of the present disclosure, the current image and the standard image of the at least one hot zone may be stored in a cloud storage space interacting with the camera equipment. For example, the cloud storage space may store all images shot by a plurality of camera equipment, from which the operation S620 may acquire the current image and the standard image of the at least one hot zone. According to an embodiment of the present disclosure, the cloud storage space may also, for example, periodically clear the current image of the at least one hot zone it stores, so that the cloud storage space only stores the current image of the at least one hot zone in a certain time period recently (for example, within a week).

In an operation S630, a placing state of an item corresponding to the at least one hot zone is determined according to the current image and the standard image of the at least one hot zone.

According to an embodiment of the present disclosure, the operation S630 may be implemented for example through an image recognition and a comparison algorithm. Specifically, by identifying and comparing the current image and the standard image of the at least one hot zone, and combining an item placing state judgment logic to obtain the placing state of the item corresponding to the at least one hot zone.

According to an embodiment of the present disclosure, the image recognition may be implemented mainly through an object detection algorithm (specifically, a Faster-RCNN algorithm), so as to obtain an item feature included in the current image of the at least one hot zone. The item feature may include at least one of an item name, the quantity of items corresponding to the item name, an item identification and an item location corresponding to the item name, etc. Herein, a standard item feature may be obtained by identifying the standard image of the at least one hot zone in advance by using the image recognition. The standard item feature may include at least one of a standard item name, the quantity of standard items corresponding to the standard item name, a standard item identification and a standard item location corresponding to the standard item name.

According to an embodiment of the present disclosure, specifically, for example, the judgment logic may determine in the current image of at least one hot zone obtained through the image recognition: whether the item name is the same as the standard item name, whether a ratio of the quantity of items corresponding to the item name the same as the standard item name to the quantity of standard items corresponding to the standard item name is greater than a first ratio, and among the item name the same as the standard item name, whether a ratio of the quantity of item identifications which has a similarity with the standard item identification corresponding to the standard item name lower than a pre-set similarity, to the total quantity of the item identifications corresponding to the item name is less than a second ratio. It can be understood that the judgment logic above is only used as an example to facilitate understanding the present disclosure, and is not limited by the present disclosure.

Figure 7:
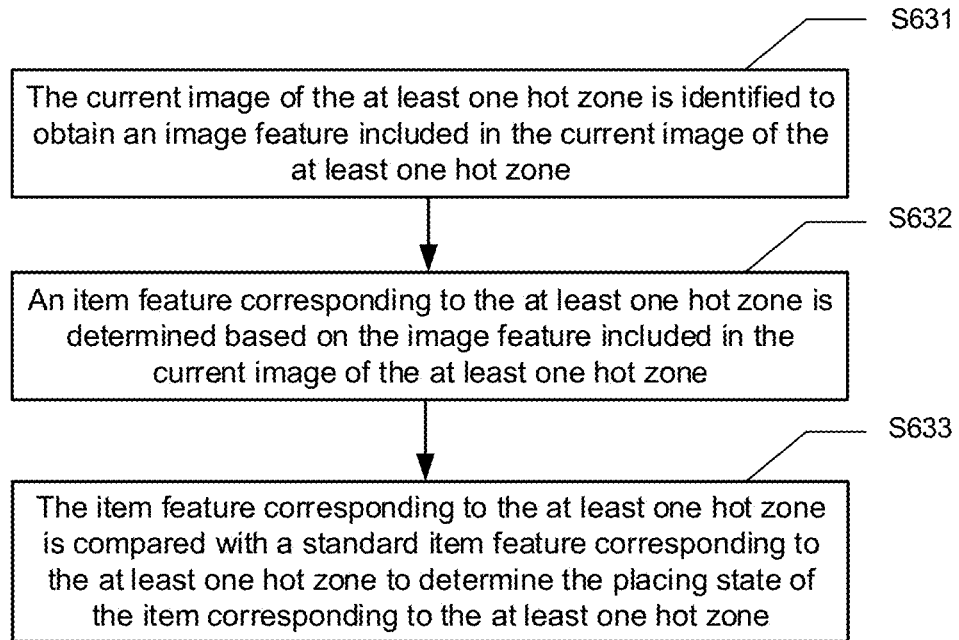
FIG. 7 shows a schematic flowchart of determining an item placing state according to an embodiment of the present disclosure.

FIG. 7 shows a schematic flowchart of determining an item placing state according to an embodiment of the present disclosure.

As shown in FIG. 7, with reference to FIG. 6, an operation S630 for determining the placing state of an item may specifically include operations S631 to S633.

In an operation S631, the current image of the at least one hot zone is identified to obtain an image feature included in the current image of the at least one hot zone. In an operation S632, an item feature corresponding to the at least one hot zone is determined based on the image feature included in the current image of the at least one hot zone. In an operation S633, the item feature corresponding to the at least one hot zone is compared with a standard item feature corresponding to the at least one hot zone to determine the placing state of the item corresponding to the at least one hot zone.

According to an embodiment of the present disclosure, the operations S631 to S632 described above may be specifically performed by using an image recognition algorithm (for example, a Faster-RCNN algorithm), or performed through a deep learning model trained by using the image recognition algorithm as a basic algorithm, using a large quantity of images including different items as training data, and using real-time images of the shelf as test data. An input of the model may be for example a divided current image of the shelf obtained through the operation described with reference to FIG. 5, or may be a current image of the shelf obtained through the operation described with reference to FIG. 5 and a coordinate range of an area corresponding to one or more hot zones in the standard image of the shelf. An output of the model is the item feature corresponding to the hot zone obtained in operation S632, or the item feature corresponding to one or more hot zones included in the shelf. For the case where the item features corresponding to a plurality of hot zones are acquired, the item features may be grouped according to the hot zones by using the item location corresponding to the item name in the item features.

According to an embodiment of the present disclosure, specifically, for example, an operation S633 may obtain the placing state of the item corresponding to at least one hot zone by using the judgment logic described above, and will not be repeated here.

Figure 8A:
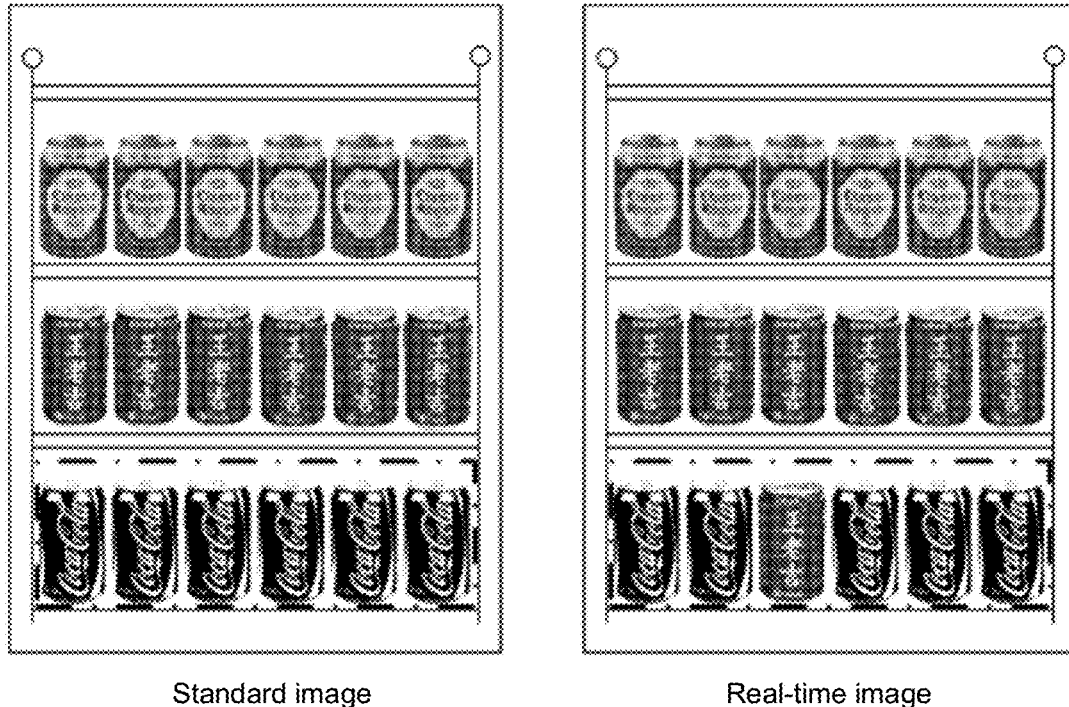

FIGS. 8A to 8C show schematic diagrams of an item placing state being an abnormal state according to an embodiment of the present disclosure.

The placing state of the item corresponding to the hot zone determined with reference to FIGS. 6 to 7 includes a normal state and an abnormal state. Herein, the abnormal state may include at least one of the following situations.

Among item features corresponding to the hot zone, there is existed an item name which is different from a standard item name out of corresponding standard item features. Specifically, for the standard image of the shelf shown in the left in FIG. 8A, a standard item name corresponding to a hot zone (an area enclosed by a dotted box) included in the shelf is for example "Coca-Cola". For the real-time image (current image) of the shelf shown in the right in FIG. 8A, the item names corresponding to the hot zone obtained with reference to operation S632 in FIG. 7 includes "Coca-Cola" and "Wang Lao Ji". Since the item name obtained "Wang Lao Ji" is different from the standard item name "Coca-Cola", the placing state of the items corresponding to hot zone is an abnormal state "misplaced". It can be understood that the standard image, the real-time image, the standard item information, and the item information corresponding to the hot zone are only used as examples to facilitate understanding the present disclosure, and is not limited by the present disclosure.

Among item features corresponding to the hot zone, a ratio of the quantity of items corresponding to an item name which is the same as a standard item name out of corresponding standard item features, to the quantity of standard items corresponding to the standard item name is less than a first ratio. Specifically, for example, the first ratio is 0.5. For the standard image of the shelf shown in the left in FIG. 8B, a standard item name corresponding to a hot zone (an area enclosed by a dotted box) included in the shelf is for example "Coca-Cola", the quantity of standard items corresponding to the standard item name is 6. For the real-time image (current image) of the shelf shown in the right in FIG. 8B, among the item names corresponding to the hot zone obtained with reference to operation S632 in FIG. 7, an item name the same as the standard item name is "Coca-Cola", and the quantity of the item corresponding to the item name is 2. A ratio of the quantity of the item to the quantity 6 of standard item corresponding to the standard item name is $2/6=1/3$, which is less than the first ratio 0.5. Then the placing state of the item corresponding to the hot zone is an abnormal state "out of stock". It can be understood that the standard image, the real-time image, the standard item information, the item information corresponding to the hot zone and the value of the first ratio are only used as examples to facilitate understanding the present disclosure, and is not limited by the present disclosure. According to an embodiment of the present disclosure, if the ratio of the quantity of the item to the quantity of the standard item corresponding to the standard item name is not an integer, the ratio may be compared with the first ratio after being rounded up.

Among item identifications corresponding to an item name out of corresponding item features, wherein the item name out of corresponding item features is the same as a standard item name out of corresponding standard item features, a ratio of the quantity of an item identification which has a similarity with a standard item identification corresponding to the standard item name lower than a pre-set similarity, to the total quantity of the item identifications corresponding to the item name is greater than a second ratio. Specifically, the pre-set similarity is 50%, and the second ratio is 0.5. For the standard image of the shelf shown in the left in FIG. 8C, a standard item name corresponding to a hot zone (an area enclosed by a dotted box) included in the shelf is "Coca-Cola", and a standard item identification corresponding to the standard item name is a vertically arranged "Coca-Cola" pattern exposed completely on the surface of a can body of the item in the image. For the real-time image (current image) of the shelf shown in the right in FIG. 8C, among the item names corresponding to the hot zone obtained with reference to operation S632 in FIG. 7, an item name the same as the standard item name is "Coca-Cola", and the quantity of the item corresponding to the item name is 6. Item identifications corresponding to the item name include not only a "Coca-Cola" pattern exposed completely but also a "Coca-Cola" pattern exposed partially, and a similarity between the "Coca-Cola" pattern exposed partially and the "Coca-Cola" pattern exposed completely is only 30%, i.e., an exposing proportion of the word "Coca-Cola" in the "Coca-Cola" pattern exposed partially is less than 30%. The quantity of the "Coca-Cola" patterns exposed partially is 4, and a ratio of the quantity of the "Coca-Cola" patterns exposed partially to the quantity 6 of items is $4/6=2/3$, which is greater than the second ratio 0.5. As a result, the placing state of the item corresponding to the hot zone is an abnormal state "irregular". It can be understood that the standard image, the real-time image, the standard item information, the item information corresponding to the hot zone, the value of the pre-set similarity and the value of the second ratio are only used as examples to facilitate understanding the present disclosure, and is not limited by the present disclosure. According to an embodiment of the present disclosure, if the ratio of the quantity of items mentioned above is not an integer, the ratio may be compared with the second ratio after being rounded up.

For a situation that is not any of the abnormal state, the placing state of the item corresponding to the hot zone is a normal state.

FIGS. 9A to 9E show schematic structural block diagrams of a system for acquiring an item placing state according to an embodiment of the present disclosure.

Figure 9A:
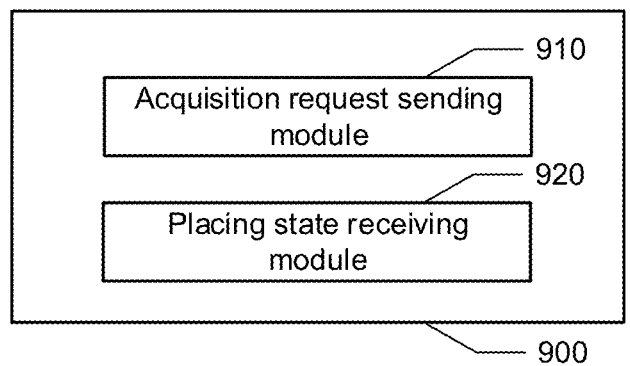
FIGS. 9A to 9E show schematic structural block diagrams of a system for acquiring an item placing state according to an embodiment of the present disclosure.

As shown in FIG. 9A, the system 900 for acquiring an item placing state may interact with a processing system (such as the cloud system 102 described with reference to FIG. 1), and the system 900 for acquiring an item placing state includes an acquisition request sending module 910 and a placing state receiving module 920.

Herein, the acquisition request sending module 910 is used to send an acquisition request. The acquisition request includes one or more association relationships, and each of the association relationships includes an association relationship between a hot zone and a camera equipment. One hot zone corresponds to one kind of item. Herein the camera equipment is configured to acquire a current image of a hot zone having an association relationship with the camera equipment. According to an embodiment of the present disclosure, the acquisition request sending module 910 may perform the operation S210 described with reference to FIG. 2A, and will not be repeated here.

Herein, the placing state receiving module 920 is used to receive a placing state of an item corresponding to at least one hot zone. The placing state of the item corresponding to the at least one hot zone is determined according to a current image and a standard image of the at least one hot zone by the processing system in response to the acquisition request. Herein, according to an embodiment of the present disclosure, the placing state receiving module 920 may perform the operation S220 described with reference to FIG. 2A, and will not be repeated here.

Figure 9B:
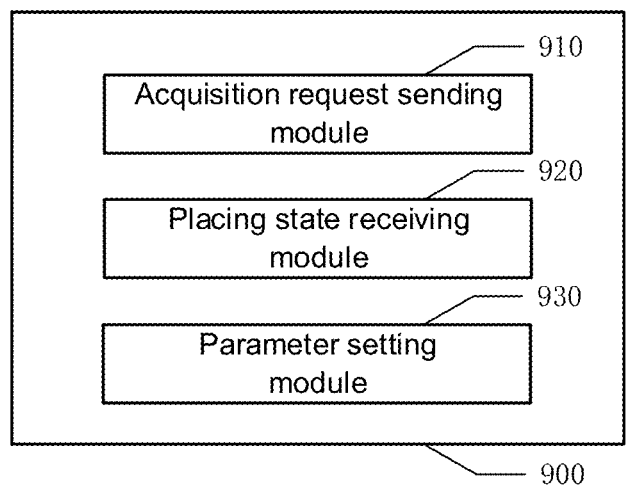

According to an embodiment of the present disclosure, as shown in FIG. 9B, the system 900 for acquiring an item placing state may further include for example a parameter setting module 930. The parameter setting module 930 is used to set the one or more association relationships included in the acquisition request. According to an embodiment of the present disclosure, the parameter setting module 930 may perform the operation S230 described with reference to FIG. 2B, and will not be repeated here.

According to an embodiment of the present disclosure, the parameter setting module 930 may also for example be used to set a period for the camera equipment acquiring the current image of the hot zone having an association relationship with the camera equipment, and/or the placing state receiving module 920 may also for example be used to set a period for receiving the placing state of the item corresponding to the at least one hot zone. Herein, the period for receiving the placing state of the item corresponding to the at least one hot zone is not shorter than a period for the camera equipment to acquire the current image of the hot zone having an association relationship with the camera equipment.

Figure 9C:
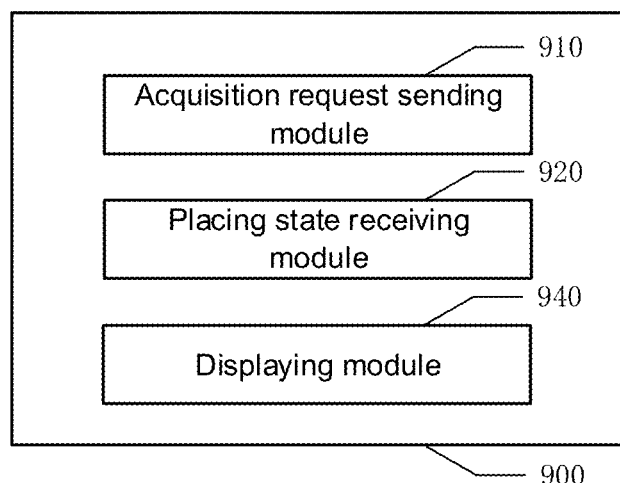

According to an embodiment of the present disclosure, as shown in FIG. 9C, the system 900 for acquiring an item placing state may further include a displaying module 940. The displaying module 940 is used to display a placing state of an item corresponding to one or more of the at least one hot zone. According to an embodiment of the present disclosure, the displaying module 940 may perform the operation S240 described with reference to FIG. 2B, and will not be repeated here.

Figure 9D:
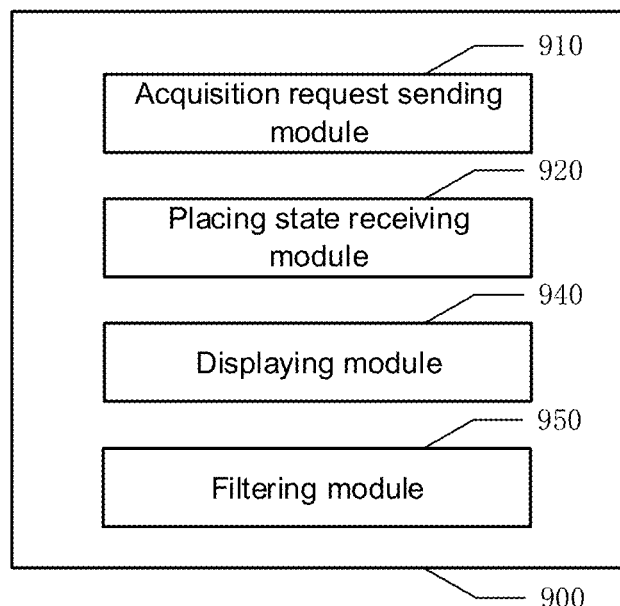

According to an embodiment of the present disclosure, as shown in FIG. 9D, the system 900 for acquiring an item placing state may further include a filtering module 950. The filtering module 950 is used to obtain a placing state of an item matching a filtering condition and corresponding to one or more hot zones for display, by filtering from the placing state of the item corresponding to the at least one hot zone, according to a filtering condition input by a user. According to an embodiment of the present disclosure, the filtering module 950 may be used to perform the operation S350 described with reference to FIG. 3A, and correspondingly, the displaying module 940 may also be used to perform the operation S360 described with reference to FIG. 3A, and will not be repeated here.

Figure 9E:
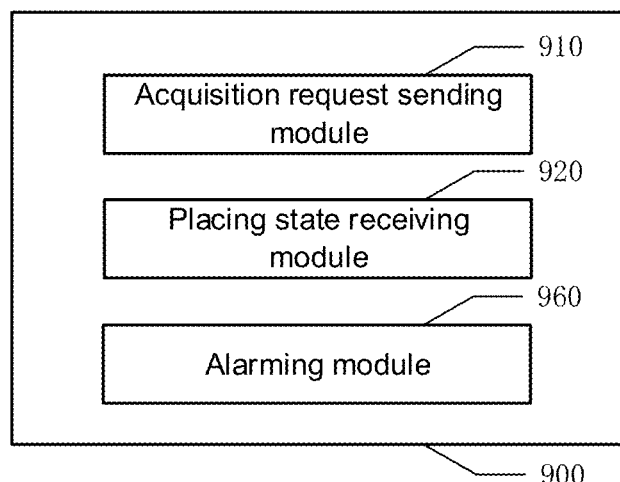

According to an embodiment of the present disclosure, the placing state of the item corresponding to the at least one hot zone includes a normal state and an abnormal state. As shown in FIG. 9E, the system 900 for acquiring an item placing state may further include for example an alarming module 960. The alarming module 960 is used to send an alarm signal to the terminal equipment under the case where the placing state of the item corresponding to one or more of the at least one hot zone is an abnormal state. According to an embodiment of the present disclosure, the alarming module 960 may perform the operation S370 described with reference to FIG. 3B, and will not be repeated here.

According to an embodiment of the present disclosure, acquiring of the current image of the hot zone having an association relationship with the camera equipment includes: acquiring a plurality of real-time images of the hot zone having an association relationship with the camera equipment, wherein the plurality of real-time images are continuously acquired according to a time interval; identifying the plurality of real-time images to acquire the quantity of items included in the plurality of real-time images; and determining a current image of the hot zone having an association relationship with the camera equipment, wherein the current image is the real-time image having the largest quantity of items in the plurality of real-time images. Herein, the camera equipment has an association relationship with one or more hot zones. According to an embodiment of the present disclosure, acquiring of the current image of the hot zone having an association relationship with the camera equipment may be obtained through operations S510 to S530 described with reference to FIG. 5, and will not be repeated here.

According to an embodiment of the present disclosure, the system 900 for acquiring an item placing state may be disposed in the terminal equipment 101 described with reference to FIG. 1.

Functions of two or more of modules, sub-modules, units, and subunits according to the embodiments of the present disclosure, or at least a part thereof, may be implemented in one module. One or more of the modules, sub-modules, units, and sub-units according to the embodiments of the present disclosure may be split into multiple modules for implementation. One or more of the modules, sub-modules, units, and sub-units according to the embodiments of the present disclosure may be at least partially implemented as hardware circuits, such as field programmable gate array (FPGA), programmable logic array (PLA), system-on-chip, system-on-substrate, system-on-package, application specific integrated circuit (ASIC), or may be implemented by hardware or firmware in any other reasonable way that integrates or encapsulates the circuit, or by any one of the three implementation modes of software, hardware and firmware or in an appropriate combination of any of them. Alternatively, one or more of the modules, sub-modules, units, and sub-units according to the embodiments of the present disclosure may be at least partially implemented as a computer program module, and when the computer program module is executed, it may perform corresponding functions.

For example, two or more of the acquisition request sending module 910, the placing state receiving module 920, the parameter setting module 930, the displaying module 940, the filtering module 950 and the alarming module 960 may be combined into one module for implementation, or one of the acquisition request sending module 910, the placing state receiving module 920, the parameter setting module 930, the displaying module 940, the filtering module 950 and the alarming module 960 may be split into multiple modules. Alternatively, at least part of the functions of the one or more of these modules may be combined with at least part of the functions of other modules and implemented in one module. According to an embodiment of the present disclosure, at least one of the acquisition request sending module 910, the placing state receiving module 920, the parameter setting module 930, the displaying module 940, the filtering module 950 and the alarming module 960 may be at least partially implemented as a hardware circuit, such as field programmable gate array (FPGA), programmable logic array (PLA), system-on-chip, system-on-substrate, system-on-package, application specific integrated circuit (ASIC), or may be implemented by hardware or firmware in any other reasonable way that integrates or encapsulates the circuit, or by any one of the three implementation modes of software, hardware and firmware or in an appropriate combination of any of them. Alternatively, at least one of the acquisition request sending module 910, the placing state receiving module 920, the parameter setting module 930, the displaying module 940, the filtering module 950 and the alarming module 960 may be at least partially implemented as a computer program module, and when the computer program module is executed, it may perform corresponding functions.

Figure 10A:
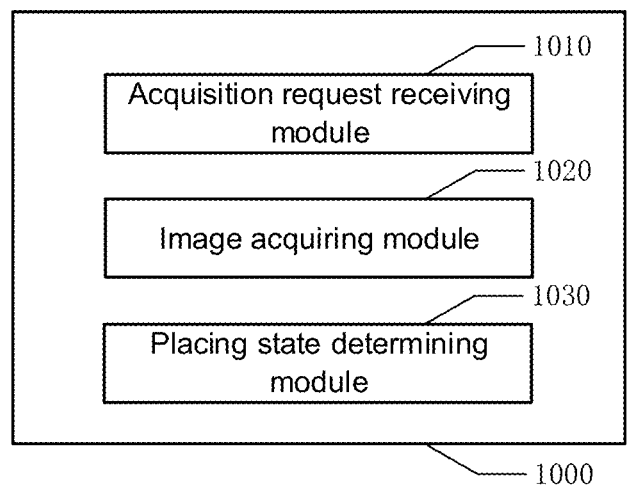
FIGS. 10A to 10O show schematic structural block diagrams of a processing system according to an embodiment of the present disclosure.
Figure 10B:
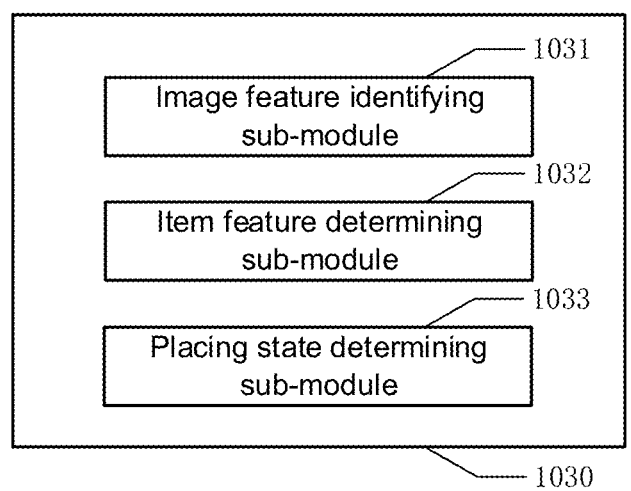
Figure 10C:
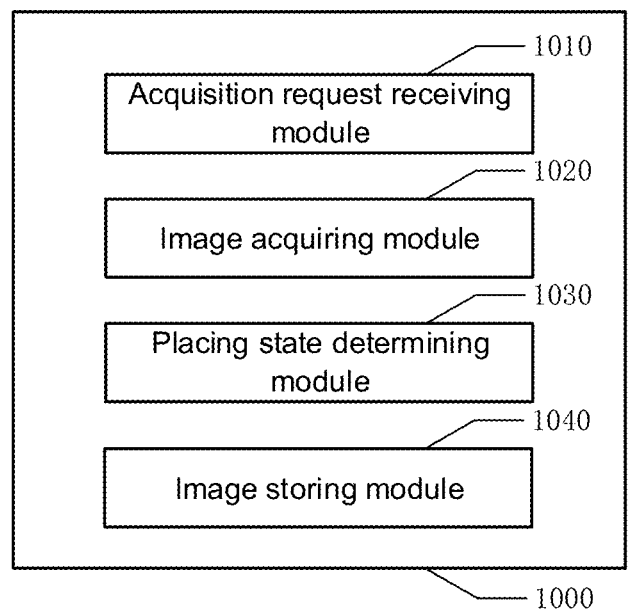

FIGS. 10A to 10C show schematic structural block diagrams of a processing system according to an embodiment of the present disclosure.

As shown in FIG. 10A, the processing system 1000 may for example interact with the system for acquiring an item placing state described with reference to FIG. 9. The processing system 1000 includes an acquisition request receiving module 1010, an image acquiring module 1020 and a placing state determining module 1030.

Among them, the acquisition request receiving module 1010 is used to receive an acquisition request sent by the system for acquiring an item placing state. Herein, the acquisition request includes one or more association relationships, and each of the association relationships includes an association relationship between a hot zone and a camera equipment. One hot zone corresponds to one kind of item. Herein, the camera equipment is configured to acquire a current image of a hot zone having an association relationship with the camera equipment. According to an embodiment of the present disclosure, the acquisition request receiving module 1010 may for example be used to perform the operation S610 described with reference to FIG. 6, and will not be repeated here.

Herein, the image acquiring module 1020 is used to acquire a current image and a standard image of at least one hot zone in response to the acquisition request. According to an embodiment of the present disclosure, the image acquiring module 1020 may for example be used to perform the operation S620 described with reference to FIG. 6, and will not be repeated here.

According to an embodiment of the present disclosure, acquiring of the current image of the hot zone having an association relationship with the camera equipment includes: acquiring a plurality of real-time images of the hot zone having an association relationship with the camera equipment, wherein the plurality of real-time images are continuously acquired according to a time interval; identifying the plurality of real-time images to acquire the quantity of items included in the plurality of real-time images; and determining a current image of the hot zone having an association relationship with the camera equipment, wherein the current image is the real-time image having the largest quantity of items in the plurality of real-time images. Herein, the camera equipment has an association relationship with one or more hot zones. According to an embodiment of the present disclosure, acquiring of the current image may be obtained through the operations described with reference to FIG. 5, and will not be repeated here.

Herein, the placing state determining module 1030 is used to determine a placing state of an item corresponding to the at least one hot zone according to the current image and the standard image of the at least one hot zone. According to an embodiment of the present disclosure, the placing state determining module 1030 may for example be used to perform the operation S630 described with reference to FIG. 6, and will not be repeated here.

According to an embodiment of the present disclosure, as shown in FIG. 10B, the placing state determining module 1030 may for example include an image feature identifying sub-module 1031, an item feature determining sub-module 1032 and a placing state determining sub-module 1033.

The image feature identifying sub-module 1031 is used to identify the current image of the at least one hot zone to obtain an image feature included in the current image of the at least one hot zone. The item feature determining sub-module 1032 is used to determine an item feature corresponding to the at least one hot zone based on the image feature included in the current image of the at least one hot zone. The placing state determining sub-module 1033 is used to compare the item feature corresponding to the at least one hot zone with a standard item feature corresponding to the at least one hot zone, to determine the placing state of the item corresponding to the at least one hot zone. Herein, the standard item feature corresponding to the at least one hot zone may be obtained based on the standard image of the at least one hot zone by using the image feature identifying sub-module 1031 and the item feature determining sub-module 1032 described above. According to an embodiment of the present disclosure, the image feature identifying sub-module 1031, the item feature determining sub-module 1032, and the placing state determining sub-module 1033 may be respectively used to perform operations S631 to S633 described with reference to FIG. 7, and will not be repeated here.

According to an embodiment of the present disclosure, the placing state of the item includes a normal state and an abnormal state, and the abnormal state includes at least one of: among item features corresponding to the hot zone, there is existed an item name which is different from a standard item name out of corresponding standard item features; among item features corresponding to the hot zone, a ratio of the quantity of items corresponding to an item name which is the same as a standard item name out of corresponding standard item features, to the quantity of standard items corresponding to the standard item name is less than a first ratio; or among item identifications corresponding to an item name out of corresponding item features, wherein the item name out of corresponding item features is the same as a standard item name out of corresponding standard item features, a ratio of the quantity of an item identification which has a similarity with a standard item identification corresponding to the standard item name lower than a pre-set similarity, to the total quantity of the item identifications corresponding to the item name is greater than a second ratio. Herein, the item feature includes at least one of the item name, the quantity of items corresponding to the item name, the item identification and/or the item location corresponding to the item name. According to an embodiment of the present disclosure, the abnormal state may include, for example, the abnormal state "misplaced", "out of stock", and "irregular" described with reference to FIGS. 8A to 8C, and will not be repeated here.

According to an embodiment of the present disclosure, the processing system may be a cloud system 102 described with reference to FIG. 1, and the cloud system 102 may interact with a camera equipment to receive a real-time image of a hot zone uploaded by the camera equipment.

According to an embodiment of the present disclosure, as shown in FIG. 100, the processing system may further include an image storing module 1040. The image storing module 1040 is used to store the current image of the hot zone having an association relationship with the camera equipment acquired by the camera equipment and the standard image of the at least one hot zone, for an acquisition by the image acquiring module 1020.

Functions of two or more of modules, sub-modules, units, and subunits according to the embodiments of the present disclosure, or at least a part thereof, may be implemented in one module. One or more of the modules, sub-modules, units, and sub-units according to the embodiments of the present disclosure may be split into multiple modules for implementation. One or more of the modules, sub-modules, units, and sub-units according to the embodiments of the present disclosure may be at least partially implemented as hardware circuits, such as field programmable gate array (FPGA), programmable logic array (PLA), system-on-chip, system-on-substrate, system-on-package, application specific integrated circuit (ASIC), or may be implemented by hardware or firmware in any other reasonable way that integrates or encapsulates the circuit, or by any one of the three implementation modes of software, hardware and firmware or in an appropriate combination of any of them. Alternatively, one or more of the modules, sub-modules, units, and sub-units according to the embodiments of the present disclosure may be at least partially implemented as a computer program module, and when the computer program module is executed, it may perform corresponding functions.

For example, two or more of the acquisition request receiving module 1010, the image acquiring module 1020, the placing state determining module 1030, the image storing module 1040, the image feature identifying sub-module 1031, the item feature determining sub-module 1032 and the placing state determining sub-module 1033 may be combined into one module for implementation, or one of the acquisition request receiving module 1010, the image acquiring module 1020, the placing state determining module 1030, the image storing module 1040, the image feature identifying sub-module 1031, the item feature determining sub-module 1032 and the placing state determining sub-module 1033 may be split into multiple modules. Alternatively, at least part of the functions of the one or more of these modules may be combined with at least part of the functions of other modules and implemented in one module. According to an embodiment of the present disclosure, at least one of the acquisition request receiving module 1010, the image acquiring module 1020, the placing state determining module 1030, the image storing module 1040, the image feature identifying sub-module 1031, the item feature determining sub-module 1032 and the placing state determining sub-module 1033 may be at least partially implemented as a hardware circuit, such as field programmable gate array (FPGA), programmable logic array (PLA), system-on-chip, system-on-substrate, system-on-package, application specific integrated circuit (ASIC), or may be implemented by hardware or firmware in any other reasonable way that integrates or encapsulates the circuit, or by any one of the three implementation modes of software, hardware and firmware or in an appropriate combination of any of them. Alternatively, at least one of the acquisition request receiving module 1010, the image acquiring module 1020, the placing state determining module 1030, the image storing module 1040, the image feature identifying sub-module 1031, the item feature determining sub-module 1032 and the placing state determining sub-module 1033 may be at least partially implemented as a computer program module, and when the computer program module is executed, it may perform corresponding functions.

Figure 11:
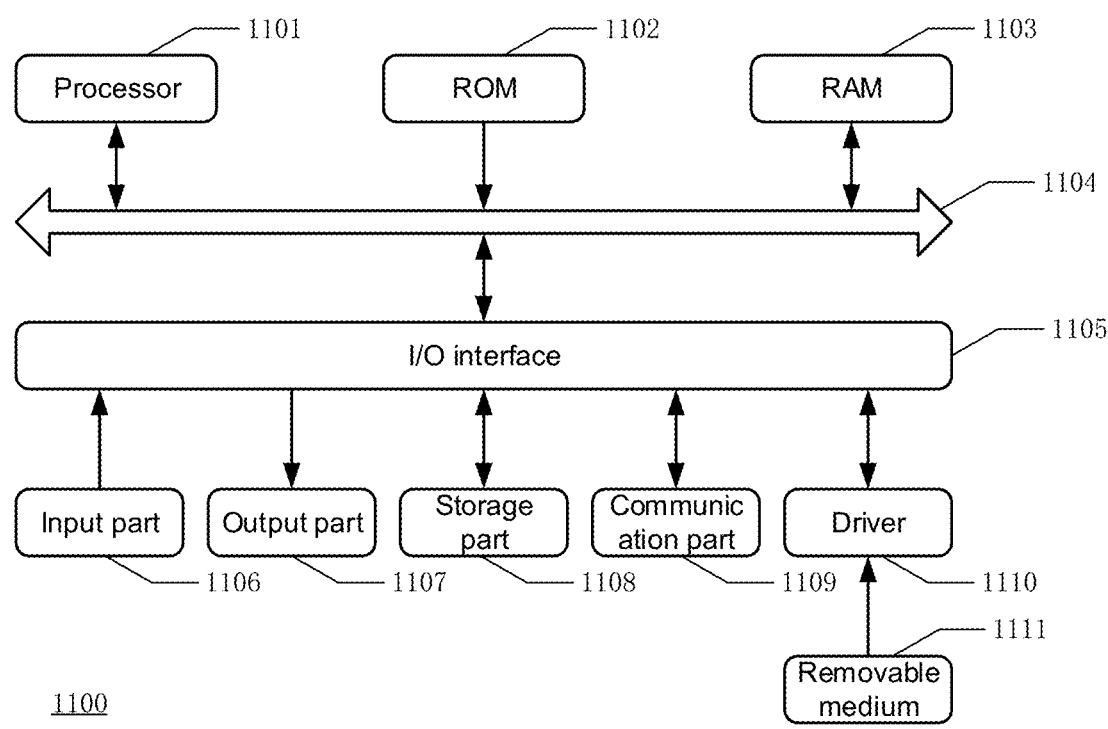
FIG. 11 shows a schematic block diagram of a computer system suitable for implementing a method for acquiring an item placing state or a processing method according to an embodiment of the present disclosure.

FIG. 11 shows a schematic block diagram of a computer system suitable for implementing a method for acquiring an item placing state or a processing method according to an embodiment of the present disclosure. The computer system shown in FIG. 11 is only an example, and should not bring any limitation to the functions and application scope of the embodiment of the present disclosure.

As shown in FIG. 11, a computer system 1100 according to an embodiment of the present disclosure includes a processor 1101, wherein the processor 1101 may execute various appropriate actions and processing according to a program stored in a read-only memory (ROM) 1102 or a program loaded from a storage part 1108 to a random access memory (RAM) 1103. The processor 1101 may include, for example, a general-purpose microprocessor (e.g., a CPU), an instruction set processor and/or a related chipset and/or a special-purpose microprocessor (e.g., an application specific integrated circuit (ASIC)), and so on. The processor 1101 may also include on-board memory for caching purposes. The processor 1101 may include a single processing unit for executing different actions of the method flow according to the embodiments of the present disclosure or multiple processing units.

In the RAM 1103, various programs and data required for the operation of the system 1100 are stored. The processor 1101, the ROM 1102, and the RAM 1103 are connected to each other through a bus 1104. The processor 1101 executes various operations of the method flow according to the embodiments of the present disclosure by executing programs in the ROM 1102 and/or RAM 1103. It should be noted that the program may also be stored in one or more memories other than the ROM 1102 and the RAM 1103. The processor 1101 may also execute various operations of the method flow according to the embodiment of the present disclosure by executing programs stored in the one or more memories.

According to an embodiment of the present disclosure, the system 1100 may further include an input/output (I/O) interface 1105, and the input/output (I/O) interface 1105 is also connected to the bus 1104. The system 1100 may also include one or more of the following components connected to the I/O interface 1105: an input part 1106 including a keyboard, a mouse, etc.; an output part 1107 including a cathode ray tube (CRT), a liquid crystal display (LCD), etc., and a speaker, etc.; a storage part 1108 including a hard disk, etc.; and a communication part 1109 including a network interface card such as a LAN card, a modem, etc. The communication part 1109 performs communication processing via a network such as the Internet. The driver 1110 is also connected to the I/O interface 1105 as needed. A removable medium 1111, such as a magnetic disk, an optical disk, a magneto-optical disk, a semiconductor memory, etc., is installed on the driver 1110 as needed, so that the computer program read from the removable medium 1111 is installed into the storage part 1108 as needed.

According to the embodiments of the present disclosure, the method flow according to the embodiments of the present disclosure may be implemented as a computer software program. For example, an embodiment of the present disclosure includes a computer program item, which includes a computer program carried on a computer-readable medium, and the computer program includes program code for executing the method shown in the flowchart. In such an embodiment, the computer program may be downloaded and installed from the network through the communication part 1109, and/or installed from the removable medium 1111. When the computer program is executed by the processor 1101, the above functions defined in the system of the embodiments of the present disclosure are executed. According to the embodiments of the present disclosure, the systems, devices, apparatus, modules, units, etc. described above may be implemented by computer program modules.

The present disclosure also provides a computer-readable medium. The computer-readable medium may be included in the device/apparatus/system described in the above embodiments; or it may exist alone without being assembled into the device/apparatus/system. The above computer-readable medium carries one or more programs, and when the one or more programs are executed, the computer-readable medium realizes the method according the embodiments of the present disclosure.

According to an embodiment of the present disclosure, the computer-readable medium may be a computer-readable signal medium or a computer-readable storage medium or any combination of the two. The computer-readable storage medium may be, for example, but not limited to, an electrical, magnetic, optical, electromagnetic, infrared, or semiconductor system, device, or apparatus, or any combination of the above. More specific examples of computer-readable storage medium may include, but are not limited to: electrical connections with one or more wires, portable computer disks, hard disks, random access memory (RAM), read-only memory (ROM), erasable programmable read-only memory (EPROM or flash memory), optical fiber, portable compact disk read-only memory (CD-ROM), optical storage device, magnetic storage device, or any suitable combination of the above. In the present disclosure, the computer-readable storage medium may be any tangible medium that includes or stores a program, and the program may be used by or in combination with an instruction execution system, device, or apparatus. In the present disclosure, a computer-readable signal medium may include a data signal propagated in a baseband or as a part of a carrier wave, and a computer-readable program code is carried therein. The propagated data signal may take various forms, including but not limited to electromagnetic signals, optical signals, or any suitable combination of them. The computer-readable signal medium may also be any computer-readable medium other than the computer-readable storage medium, the computer-readable medium may send, propagate, or send the program for use or in combination with the instruction execution system, device, or apparatus. The program code included in the computer-readable medium may be sent by any suitable medium, including but not limited to: wireless, wired, optical cable, radio frequency signals, etc., or any suitable combination of the above.

For example, according to an embodiment of the present disclosure, the computer-readable medium may include one or more memories other than the ROM 1102 and/or RAM 1103 and/or ROM 1102 and RAM 1103 described above.

The flowcharts and block diagrams in the accompanying drawings illustrate the possible architecture, functions, and operations of the system, method, and computer program product according to various embodiments of the present disclosure. In this regard, each block in the flowchart or block diagram may represent a module, program segment, or part of code, and the module, program segment, or part of code includes one or more executable instructions for realizing the specified logical function. It should also be noted that, in some alternative implementations, the functions marked in the block may also occur in a different order from the order marked in the drawings. For example, two blocks shown in succession may actually be executed substantially in parallel, and they may sometimes be executed in the reverse order, depending on the functions involved. It should also be noted that each block in the block diagram or flowchart, and the combination of blocks in the block diagram or flowchart, may be implemented by a dedicated hardware-based system that performs the specified functions or operations, or may be realized by a combination of dedicated hardware and computer instructions.

Those skilled in the art may understand that the features described in the various embodiments and/or the claims of the present disclosure may be combined and/or integrated in various ways, even if such combinations or integrations are not explicitly described in the present disclosure. In particular, without departing from the spirit and teaching of the present disclosure, the features described in the various embodiments and/or the claims of the present disclosure may be combined and/or integrated in various ways. All these combinations and/or integrations fall within the scope of the present disclosure.

The embodiments of the present disclosure have been described above. However, these embodiments are only for illustrative purposes, and are not intended to limit the scope of the present disclosure. Although the embodiments are described respectively above, it does not mean that the measures in the respective embodiments cannot be advantageously used in combination. The scope of the present disclosure is defined by the appended claims and their equivalents. Without departing from the scope of the present disclosure, those skilled in the art may make various substitutions and modifications, and these substitutions and modifications should fall within the scope of the present disclosure.

We claim:

1. A method for acquiring an item placing state, comprising:
sending an acquisition request, wherein the acquisition request comprises one or more association relationships, each of the association relationships comprises an association relationship between a hot zone and a camera equipment, and one hot zone corresponds to one kind of item; and
receiving a placing state of an item corresponding to at least one hot zone, wherein the placing state of the item corresponding to the at least one hot zone is determined according to a current image and a standard image of the at least one hot zone in response to the acquisition request,
wherein the camera equipment is configured to acquire a current image of a hot zone having an association relationship with the camera equipment.

2. The method of claim 1, further comprising:
setting the one or more association relationships; and/or
displaying the placing state of the item corresponding to one or more of the at least one hot zone; and/or
filtering, according to a filtering condition input by a user, from the placing state of the item corresponding to the at least one hot zone, to obtain a placing state of an item corresponding to one or more hot zones and matching the filtering condition,
wherein the filtering condition comprises at least one of a camera equipment number, a hot zone number, an item name, and/or a placing state of an item.

3. The method of claim 1, further comprising:
setting a period for the camera equipment to acquire the current image of the hot zone having an association relationship with the camera equipment; and/or
setting a period for receiving the placing state of the item corresponding to the at least one hot zone,
wherein the period for receiving the placing state of the item corresponding to the at least one hot zone is not shorter than the period for the camera equipment to acquire the current image of the hot zone having an association relationship with the camera equipment.

4. The method of claim 1, wherein a placing state of an item corresponding to a hot zone comprises a normal state and an abnormal state, and the method further comprises:
sending an alarm signal to a terminal equipment under the case where the placing state of the item corresponding to one or more of the at least one hot zone is an abnormal state.

5. The method of claim 1, wherein acquiring of a current image of a hot zone having an association relationship with the camera equipment comprises:
acquiring a plurality of real-time images of the hot zone having an association relationship with the camera equipment, wherein the plurality of real-time images are continuously acquired according to a time interval;
identifying the plurality of real-time images to obtain quantity of items comprised in the plurality of real-time images; and
determining the current image of the hot zone having an association relationship with the camera equipment, wherein the current image is a real-time image having the largest quantity of items comprised in the plurality of real-time images,
wherein the camera equipment has an association relationship with one or more hot zones.

6. A processing method, comprising:
receiving an acquisition request, wherein the acquisition request comprises one or more association relationships, each of the association relationships comprises an association relationship between a hot zone and a camera equipment, and one hot zone corresponds to one kind of item;
acquiring a current image and a standard image of at least one hot zone in response to the acquisition request; and
determining a placing state of an item corresponding to the at least one hot zone according to the current image and the standard image of the at least one hot zone,
wherein the camera equipment is configured to acquire a current image of a hot zone having an association relationship with the camera equipment.

7. The method of claim 6, wherein determining a placing state of an item corresponding to the at least one hot zone according to the current image and the standard image of the at least one hot zone comprises:
identifying the current image of the at least one hot zone to obtain an image feature comprised in the current image of the at least one hot zone;
determining an item feature corresponding to the at least one hot zone based on the image feature comprised in the current image of the at least one hot zone; and
comparing the item feature corresponding to the at least one hot zone with a standard item feature corresponding to the at least one hot zone to determine the placing state of the item corresponding to the at least one hot zone,
wherein the standard item feature corresponding to the at least one hot zone is obtained based on the standard image of the at least one hot zone.

8. The method of claim 7, wherein a placing state of an item corresponding to a hot zone comprises a normal state and an abnormal state, and the abnormal state comprises at least one of:
among item features corresponding to the hot zone, there is existed an item name which is different from a standard item name out of corresponding standard item features;
among item features corresponding to the hot zone, a ratio of quantity of items corresponding to an item name which is the same as a standard item name out of corresponding standard item features, to quantity of standard items corresponding to the standard item name is less than a first ratio; or
among item identifications corresponding to an item name out of item features corresponding to the hot zone, wherein the item name out of the item features is the same as a standard item name out of corresponding standard item features, a ratio of quantity of item identifications which has a similarity with a standard item identification corresponding to the standard item name lower than a pre-set similarity, to the total quantity of the item identifications corresponding to the item name is greater than a second ratio,
wherein the item feature comprises at least one of an item name, quantity of items corresponding to the item name, an item identification corresponding to the item name, and/or an item location corresponding to the item name.

9. The method of claim 6, wherein acquiring of a current image of a hot zone having an association relationship with the camera equipment comprises:
   acquiring a plurality of real-time images of the hot zone having an association relationship with the camera equipment, wherein the plurality of real-time images are continuously acquired according to a time interval;
   identifying the plurality of real-time images to obtain quantity of items comprised in the plurality of real-time images; and
   determining the current image of a hot zone having an association relationship with the camera equipment, wherein the current image is a real-time image having the largest quantity of items comprised in the plurality of real-time images,
   wherein the camera equipment has an association relationship with one or more hot zones.

10. A system for acquiring an item placing state capable of interacting with a processing system, comprising:
    an acquisition request sending module configured to send an acquisition request, wherein the acquisition request comprises one or more association relationships, each of the association relationships comprises an association relationship between a hot zone and a camera equipment, and one hot zone corresponds to one kind of item; and
    a placing state receiving module configured to receive a placing state of an item corresponding to at least one hot zone, wherein the placing state of the item corresponding to the at least one hot zone is determined by the processing system according to a current image and a standard image of the at least one hot zone in response to the acquisition request,
    wherein the camera equipment is configured to acquire a current image of a hot zone having an association relationship with the camera equipment.

11. The system of claim 10, further comprising:
    a parameter setting module configured to set the one or more association relationships; and/or
    a displaying module configured to display the placing state of the item corresponding to one or more of the at least one hot zone; and/or
    a filtering module configured to filter, according to a filtering condition input by a user, from the placing state of the item corresponding to the at least one hot zone, to obtain a placing state of an item corresponding to one or more hot zones and matching the filtering condition,
    wherein the filtering condition comprises at least one of a camera equipment number, a hot zone number, an item name, and/or a placing state of an item.

12. The system of claim 11, wherein:
    the parameter setting module is further configured to set a period for the camera equipment to acquire the current image of the hot zone having an association relationship with the camera equipment; and/or
    the placing state receiving module is further configured to set a period for receiving the placing state of the item corresponding to the at least one hot zone,
    wherein the period for receiving the placing state of the item corresponding to the at least one hot zone is not shorter than the period for the camera equipment to acquire the current image of the hot zone having an association relationship with the camera equipment.

13. The system of claim 10, wherein the placing state of the item corresponding to the at least one hot zone comprises a normal state and an abnormal state, and the system further comprises:
    an alarming module configured to send an alarm signal to a terminal equipment under the case where the placing state of the item corresponding to one or more of the at least one hot zone is an abnormal state.

14. The system of claim 10, wherein acquiring of a current image of a hot zone having an association relationship with the camera equipment comprises:
    acquiring a plurality of real-time images of the hot zone having an association relationship with the camera equipment, wherein the plurality of real-time images are continuously acquired according to a time interval;
    identifying the plurality of real-time images to obtain quantity of items comprised in the plurality of real-time images; and
    determining the current image of the hot zone having an association relationship with the camera equipment, wherein the current image is a real-time image having the largest quantity of items comprised in the plurality of real-time images,
    wherein the camera equipment has an association relationship with one or more hot zones.

* * * * *